(12) United States Patent
Anderson

(10) Patent No.: US 9,809,192 B2
(45) Date of Patent: Nov. 7, 2017

(54) PASSENGER AIRBAG

(71) Applicant: Christopher L. Anderson, Harrison Township, MI (US)

(72) Inventor: Christopher L. Anderson, Harrison Township, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 15/431,658

(22) Filed: Feb. 13, 2017

(65) Prior Publication Data

US 2017/0151927 A1     Jun. 1, 2017

Related U.S. Application Data

(63) Continuation of application No. 14/473,699, filed on Aug. 29, 2014, now Pat. No. 9,566,937.

(51) Int. Cl.

| | |
|---|---|
| *B60R 21/2334* | (2011.01) |
| *B60R 21/26* | (2011.01) |
| *B60R 21/233* | (2006.01) |
| *B60R 21/237* | (2006.01) |
| *B60R 21/235* | (2006.01) |
| *B60R 21/239* | (2006.01) |
| *B60R 21/00* | (2006.01) |

(52) U.S. Cl.
CPC ............ *B60R 21/26* (2013.01); *B60R 21/233* (2013.01); *B60R 21/235* (2013.01); *B60R 21/237* (2013.01); *B60R 21/239* (2013.01); *B60R 2021/0004* (2013.01); *B60R 2021/0006* (2013.01); *B60R 2021/0044* (2013.01); *B60R 2021/0048* (2013.01); *B60R 2021/23308* (2013.01); *B60R 2021/23324* (2013.01); *B60R 2021/23509* (2013.01); *B60R 2021/23576* (2013.01); *B60R 2021/26094* (2013.01)

(58) Field of Classification Search
CPC   B60R 2021/23382; B60R 2021/23324; B60R 2021/23308; B60R 21/233
See application file for complete search history.

(56) References Cited

U.S. PATENT DOCUMENTS

| | | | |
|---|---|---|---|
| 5,310,214 A * | 5/1994 | Cuevas ................. | B60R 21/233 280/729 |
| 6,402,190 B1 * | 6/2002 | Heudorfer ............. | B60R 21/233 137/846 |

(Continued)

FOREIGN PATENT DOCUMENTS

KR     1020060021974 A *   5/2006   ............. B60R 21/23

OTHER PUBLICATIONS

Won Suk Park, The Airbag for a Quick Expansion, May 12, 2006, KPO, KP 10-2006-0021974 A, Machine Translation of Description.*

*Primary Examiner* — James A English
(74) *Attorney, Agent, or Firm* — Meunier Carlin & Curfman LLC

(57) ABSTRACT

An airbag includes an inflation side and a vehicle occupant contact side opposite the inflation side, and a divider. The divider has a first portion attached to the inflation side and to the vehicle occupant contact side and a second portion attached to the inflation side and to the vehicle occupant contact side, such that the first and second portions tend to converge from the inflation side toward the occupant contact side.

16 Claims, 14 Drawing Sheets

(56) References Cited

U.S. PATENT DOCUMENTS

| | | | |
|---|---|---|---|
| 6,610,000 B1 * | 8/2003 | Ishii | B60R 21/201 280/728.1 |
| 9,187,055 B1 * | 11/2015 | Genthikatti | B60R 21/2338 |
| 9,566,937 B1 | 2/2017 | Anderson | |
| 2006/0151979 A1 * | 7/2006 | DePottey | B60R 21/2338 280/739 |

* cited by examiner

Hybrid III 5th Female  Hybrid III 50th Male  Hybrid III 95th Male

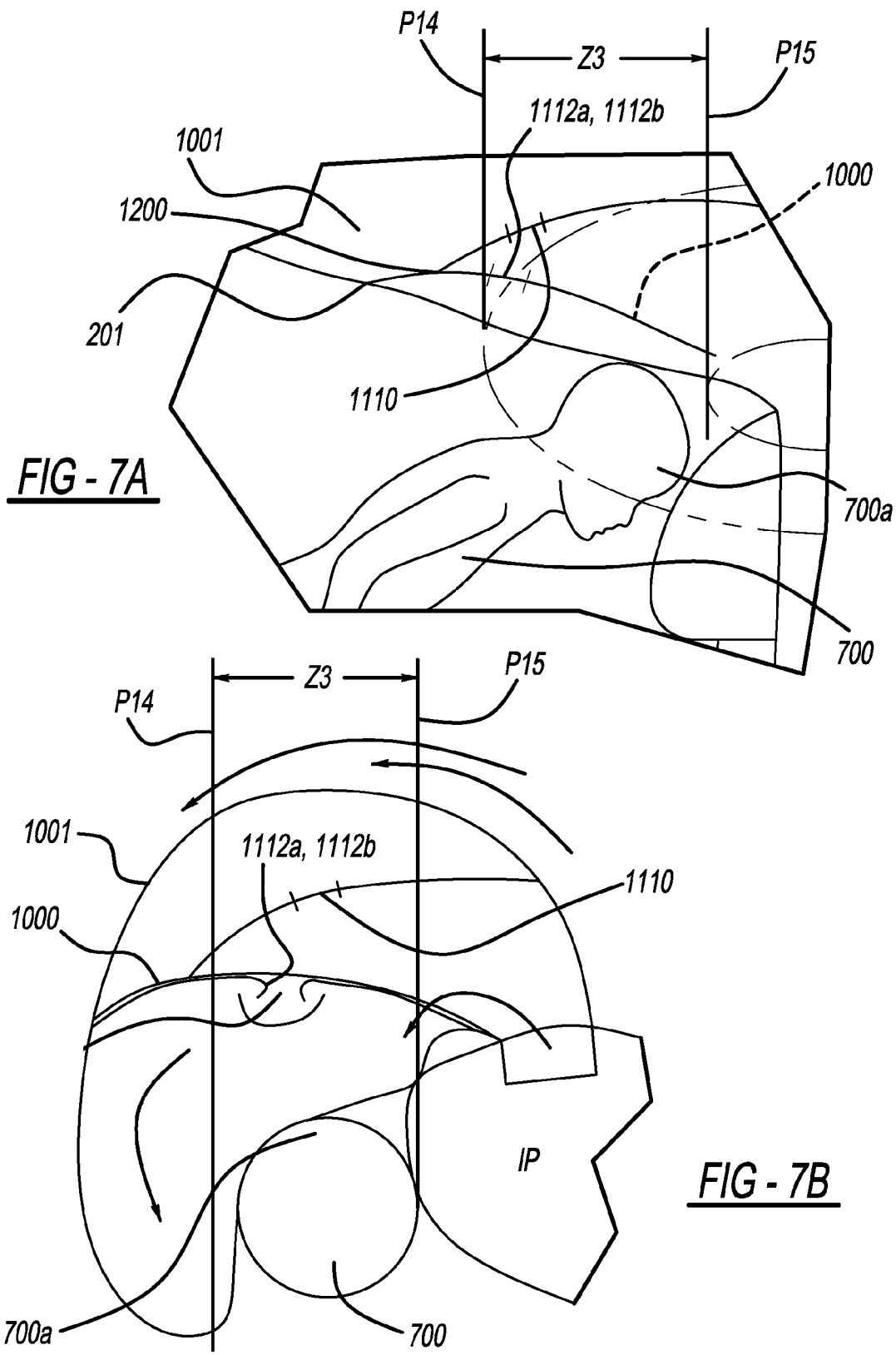

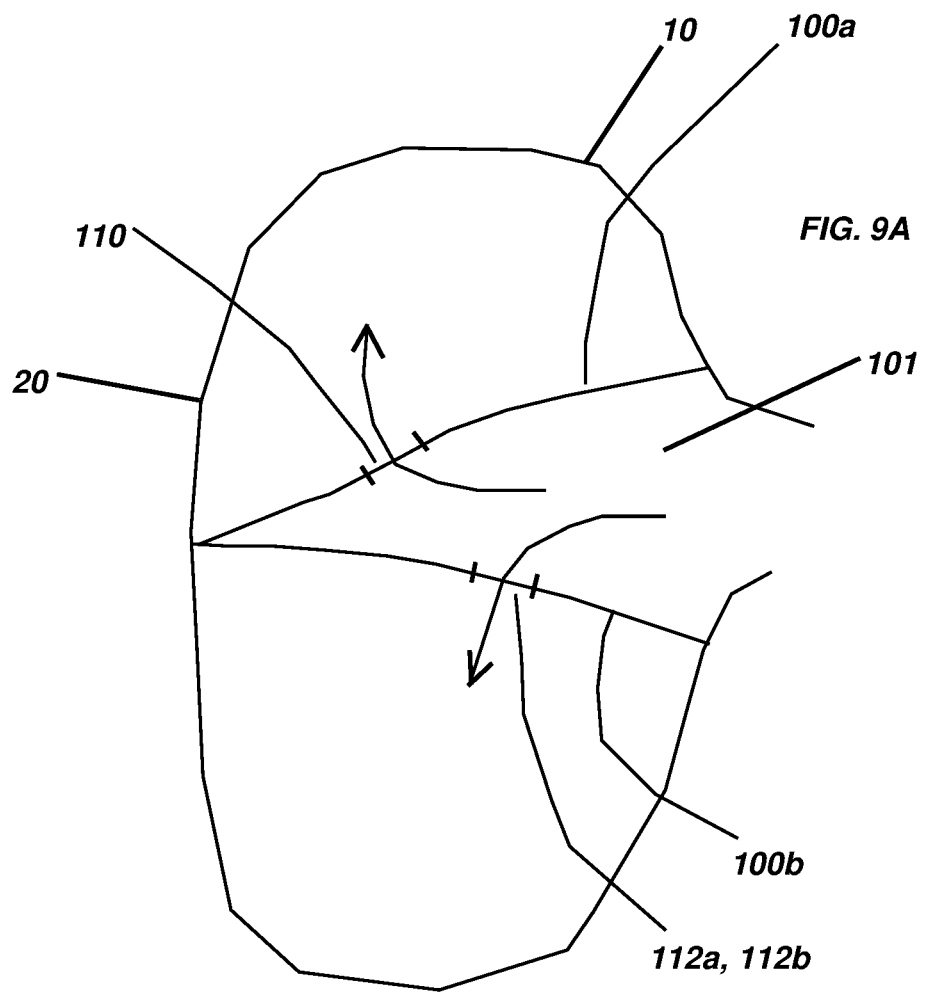

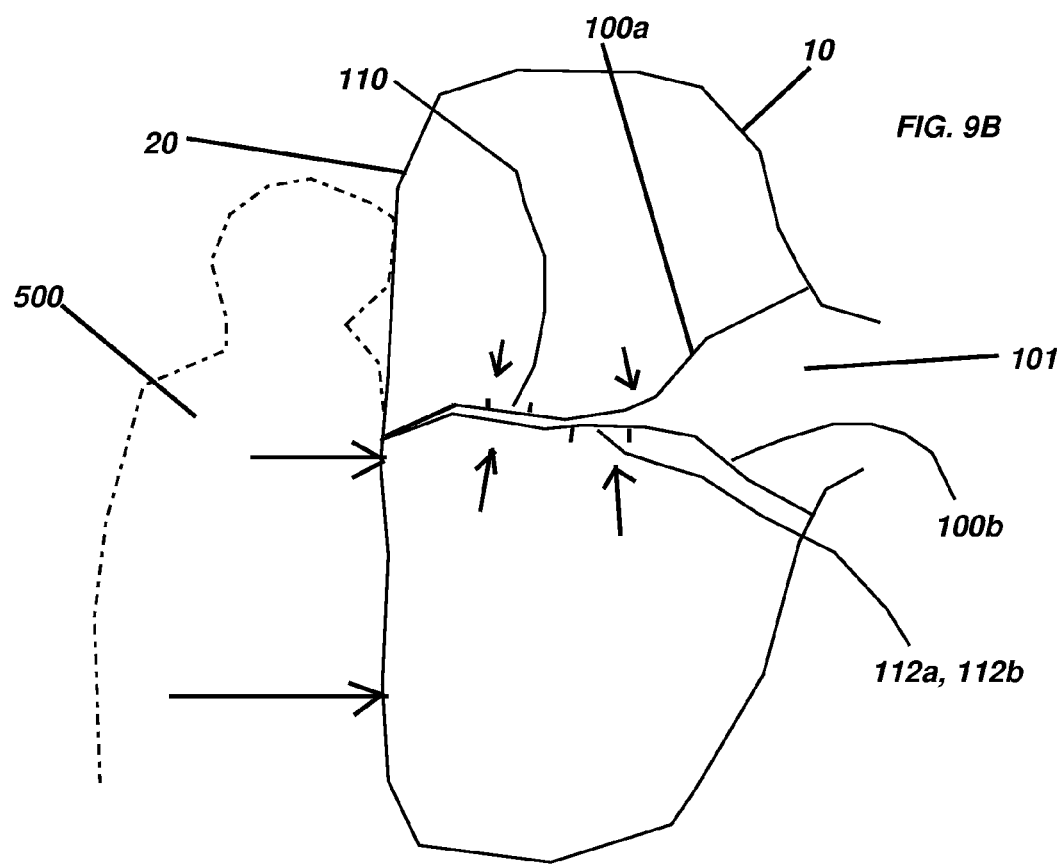

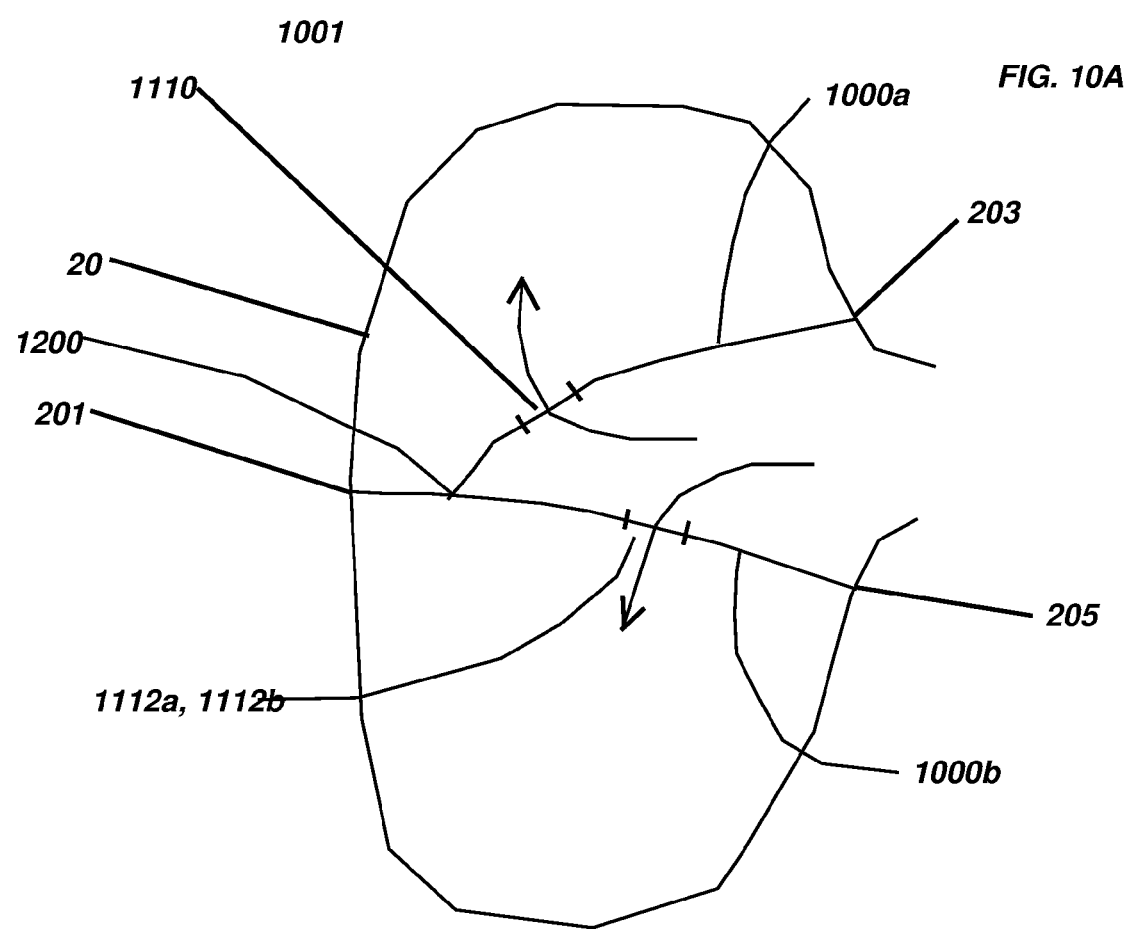

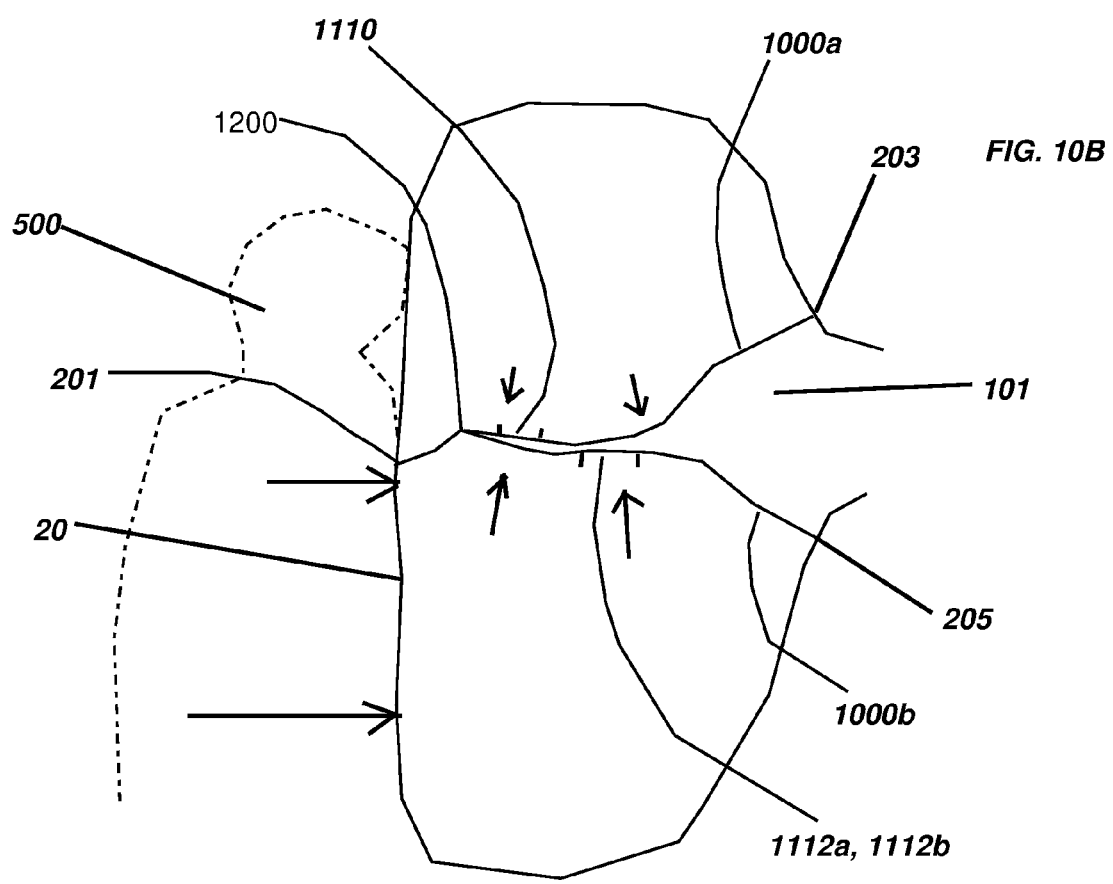

PASSENGER AIRBAG

CROSS-REFERENCE TO RELATED APPLICATIONS

This application is a continuation application of co-pending application U.S. Ser. No. 14/473,699 having a filing date of Aug. 29, 2014 which claims the benefit of U.S. Provisional Application Ser. No. 61/871,566, filed on Aug. 29, 2013, the teachings of each respective application herein incorporated by reference in its entirety.

BACKGROUND OF THE INVENTION

The embodiments described herein relate to a passenger airbag, which is filled with gas during an emergency situation such as, for example, a frontal or side impact. More particularly, the embodiments described herein relate to a passenger airbag incorporating a divider which separates an interior of the airbag into a plurality of chambers.

To optimize airbag performance in certain accident scenarios, it may be advantageous to enable a degree of control over when and how rapidly the various portions of the airbag are inflated. Thus, an ongoing need exists for improved methods and mechanisms for controlling inflation of an airbag.

SUMMARY OF THE INVENTION

In one aspect of the embodiments described herein, an airbag is provided. The airbag includes an inflation side, a vehicle occupant contact side which is opposite the inflation side, and a divider. The divider has a first portion attached to the inflation side and to the vehicle occupant contact side and a second portion attached to the inflation side and to the vehicle occupant contact side, such that the first and second portions tend to converge from the inflation side toward the occupant contact side.

In another aspect of the embodiments described herein, an airbag is provided. The airbag includes an outer shell defining an interior of the airbag, and a divider attached to the outer shell so as to define an upper chamber, a lower chamber, and a gas-receiving chamber positioned between the upper and lower chambers. The entire receiving chamber resides below the upper chamber and above the lower chamber.

In another aspect of the embodiments described herein, an airbag is provided. The airbag includes an outer shell defining an interior of the airbag. A divider is attached to the outer shell so as to define an upper chamber, a lower chamber separate from the upper chamber, and a gas-receiving chamber in fluid communication with the upper and lower chambers. The divider is structured to enable independent and simultaneous control of each of a gas flow rate from the receiving chamber into the lower chamber and a gas flow rate from the receiving chamber into the upper chamber.

BRIEF DESCRIPTION OF THE DRAWINGS

FIG. 7A is a schematic side view of a portion of the airbag shown in FIGS. 6 and 7 in the initial stages of inflation, showing locations of the inter-chamber venting.

FIG. 7B is a schematic side view of the airbag of FIG. 7A showing a later stage of inflation of the airbag.

FIG. 9A shows a portion of the airbag of FIG. 104 during inflation of the airbag.

FIG. 9B shows the airbag portion of FIG. 9A during contact of a vehicle occupant with the airbag.

FIG. 10A shows a portion of the airbag embodiment of FIGS. 6 and 7 during inflation of the airbag.

FIG. 10B shows the airbag portion of FIG. 10A during contact of a vehicle occupant with the airbag.

DETAILED DESCRIPTION

Figure 1:
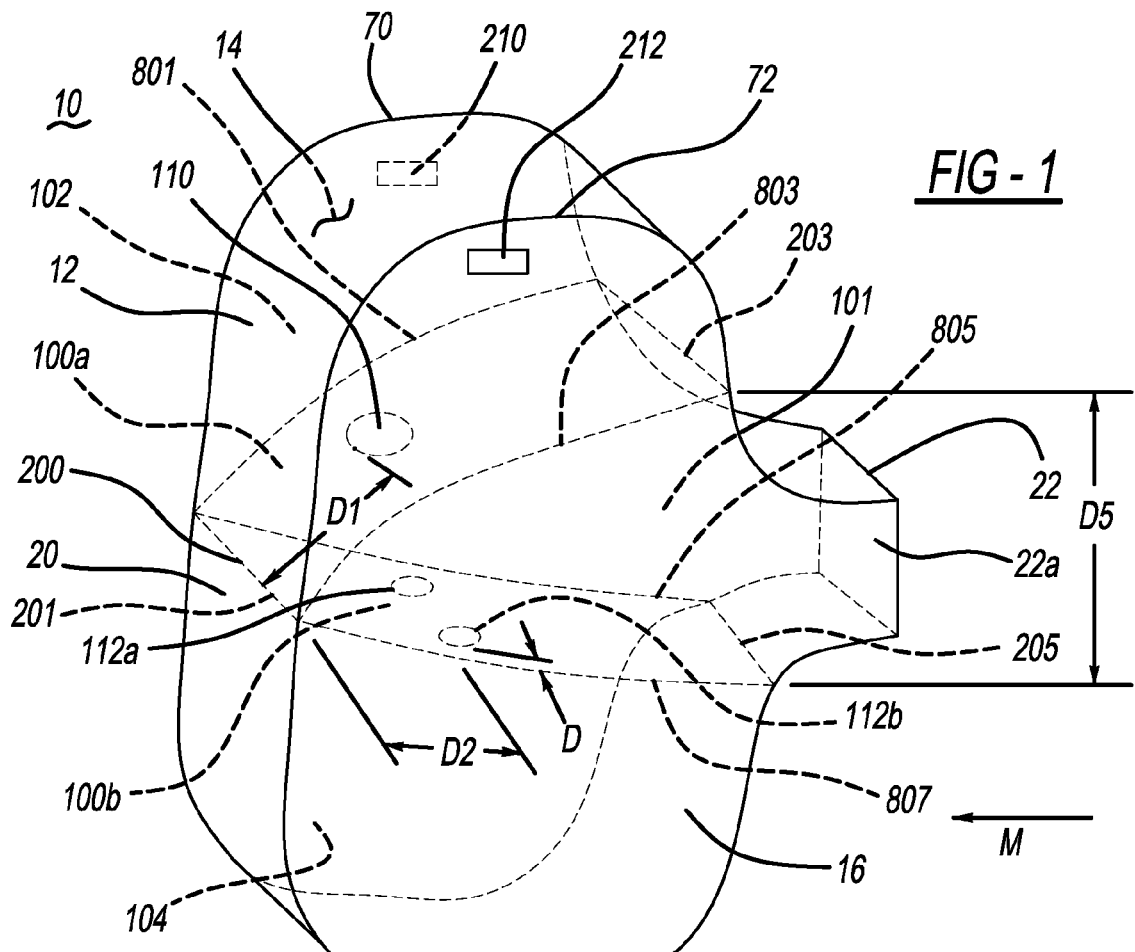
FIG. 1 is a schematic perspective view of a passenger-side airbag (in an inflated state) incorporating an airbag divider in accordance with an embodiment described herein.

Embodiments of the present invention will be described below with reference to the drawings. One of ordinary skill in the art will appreciate the various aspects of airbag design, construction and operation applicable to the embodiments of the present invention described herein. U.S. Pat. Nos. 6,886,857, 7,857,347, 8,128,124, and 8,322,748, for example, describe many such aspects and are incorporated herein by reference in their entirety, but not by way of limitation.

Like reference numerals refer to like parts throughout the description of several views of the drawings. In addition, while target values are recited for the dimensions of the various features described herein, it is understood that these values may vary slightly due to such factors as manufacturing tolerances, and also that such variations are within the contemplated scope of the embodiments described herein.

Figure 3:
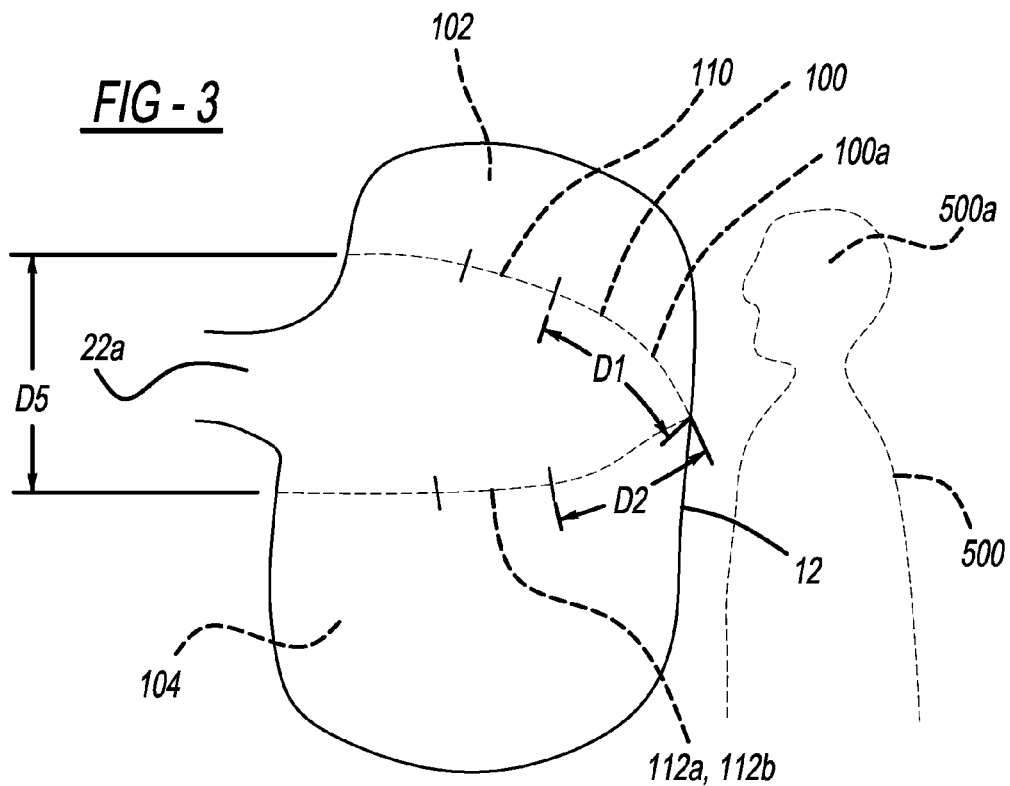
FIG. 3 is a side schematic view of the airbag of FIG. 1.
Figure 3A:
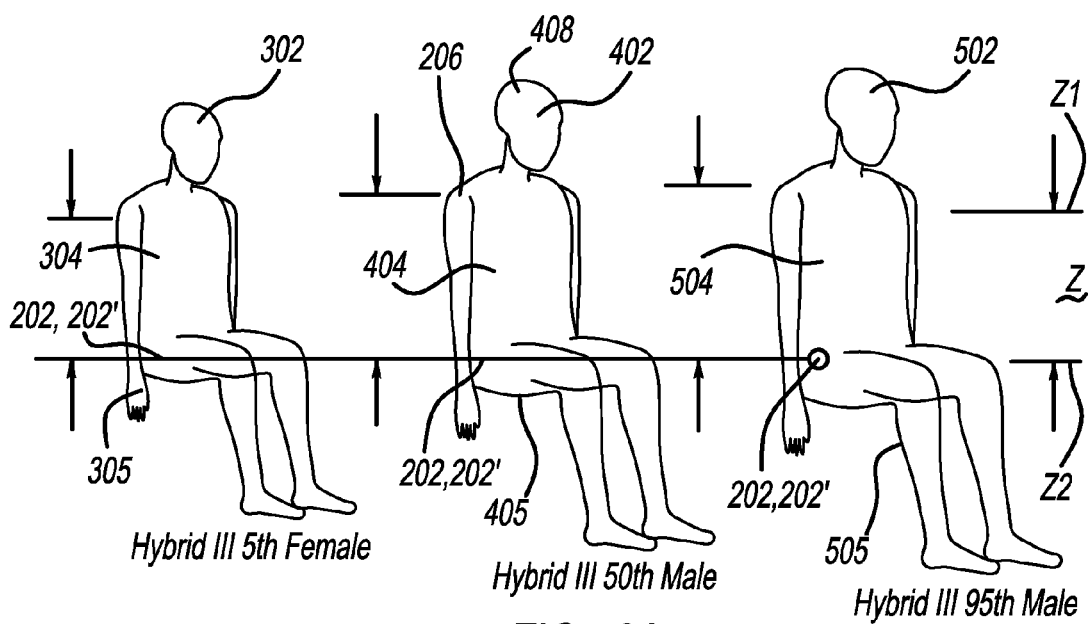
FIG. 3A is a schematic view showing relative proportions of Anthropomorphic Test Devices and relevant parameters used to define the desired positioning of the divider within the airbag, in accordance with embodiments of the present invention.

In the embodiments described herein, the inflated shapes of the airbags 10, 1001 and dividers 100, 1000 and the positions of the intersections between dividers 100, 1000 and the interior portions of the panels 12, 14, 16 to which the divider embodiments are attached are configured so as to ensure that the head and neck regions (collectively designated 302 for a Hybrid III 5th percentile female test ATD 305, 402 for Hybrid III 50th percentile male test ATD 405, and 502 for a Hybrid III 95th percentile male test ATD 505, as shown in FIG. 3A) of passengers of various sizes impact the bag along the exterior of the upper chamber 102 of the bag (i.e., that the upper chamber 102 absorbs the impact of the head and neck regions of the passenger). The configuration of the divider, its positioning within the airbag, and the position of the seam 201 attaching the divider leading edge to the panel 12 enable the cushion to match the forward movement of the relatively heavier thoracic regions (generally designated 304 in ATD 305, 404 in ATD 405, and 504 in ATD 505) to the forward movement of the relatively smaller and lighter head & neck regions 302, 402, 502.

Figure 8:
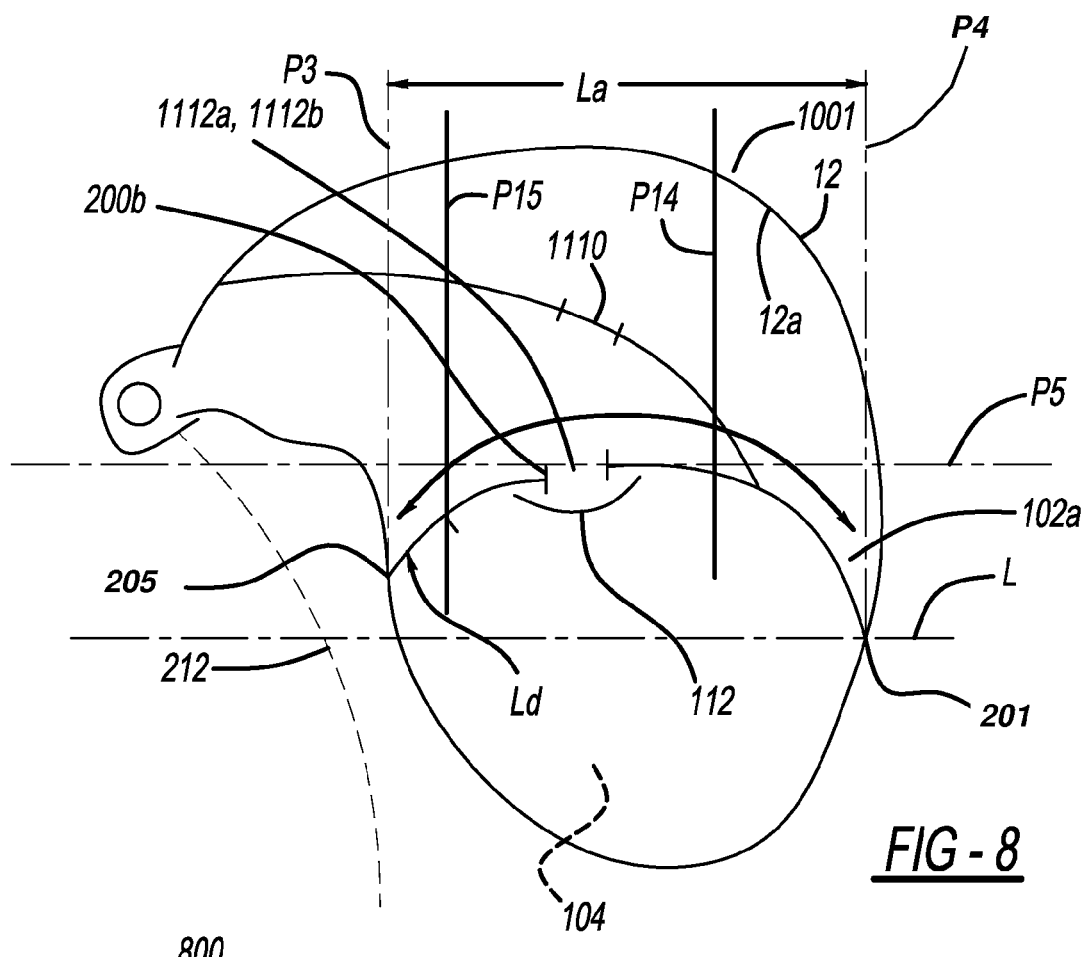
FIG. 8 is a cross-sectional side view of a particular embodiment of the airbag shown in FIG. 6 illustrating the effective horizontal length of the airbag as compared to the greater arcuate length of the divider panel, for an arcuately-extending divider second portion.
Figure 11:
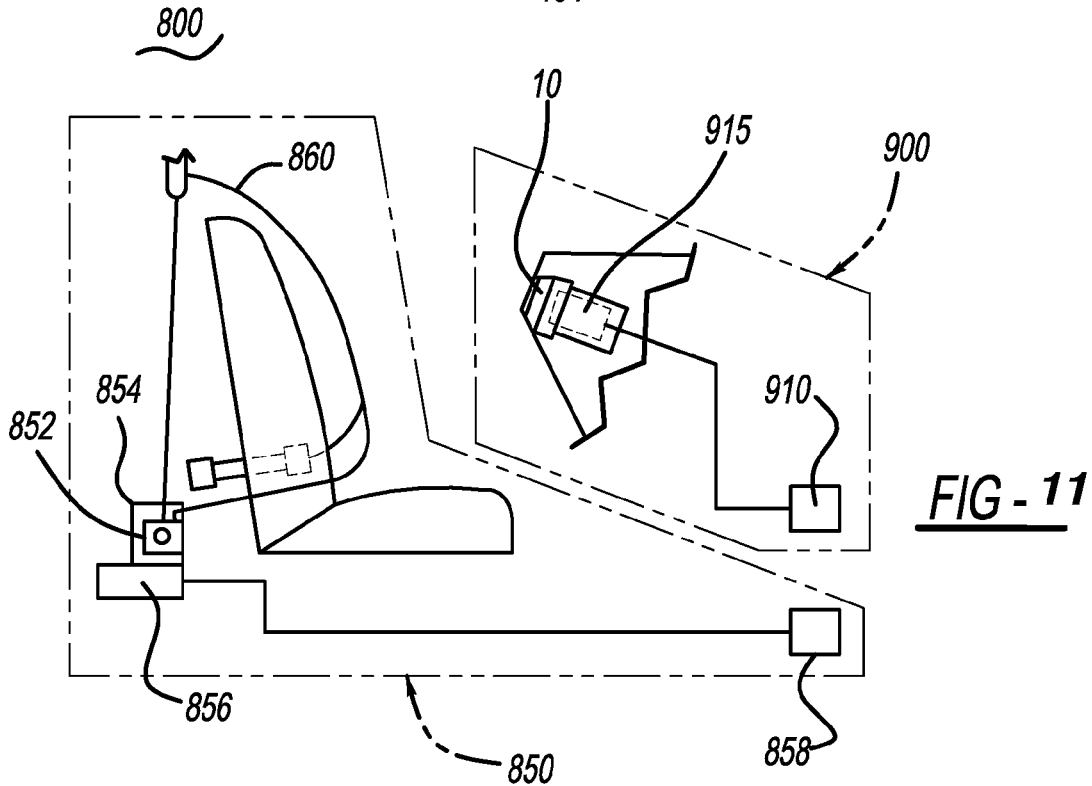
FIG. 11 is a schematic view of a vehicle occupant protection system incorporating an airbag in accordance with an embodiment described herein.
Figure 8A:
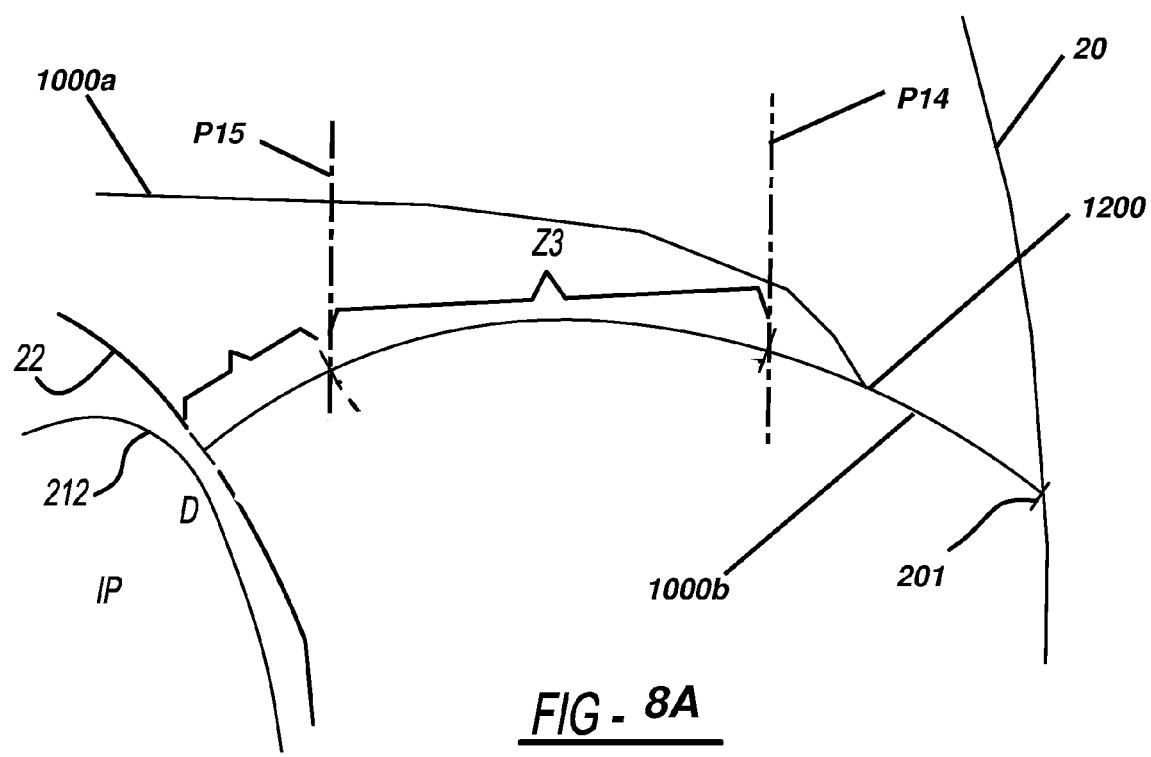
FIG. 8A is a magnified view of a portion of the airbag shown in FIG. 8.

It is noted that the hip pivots of the seated ATD's 305, 405, and 505 are collinear or at the same level, so that the hip pivot of the seated Hybrid III 50th male ATD 405 may be referred to as 202'. This common boundary of the zone Z may also serve as a reference axis. Also, in this embodiment, the portions of the body located above the respective shoulder pivots on ATD's 305, 405 and 505 are considered to define the respective head and neck regions of the ATD's. FIG. 8 shows contact between the front or contact face of a deployed airbag 10 and the divider leading edge seam 110a positioned as just described, and a Hybrid III 5th female ATD 305. FIG. 9 shows contact between a deployed airbag 10 of the same design shown in FIG. 8, and a Hybrid III 50th male ATD 405. It is seen that both of ATD's 305 and 405 contact the seam 110a connecting the divider leading edge 100a to the airbag main panel 12 within the zone Z previously described.

Figure 3B:
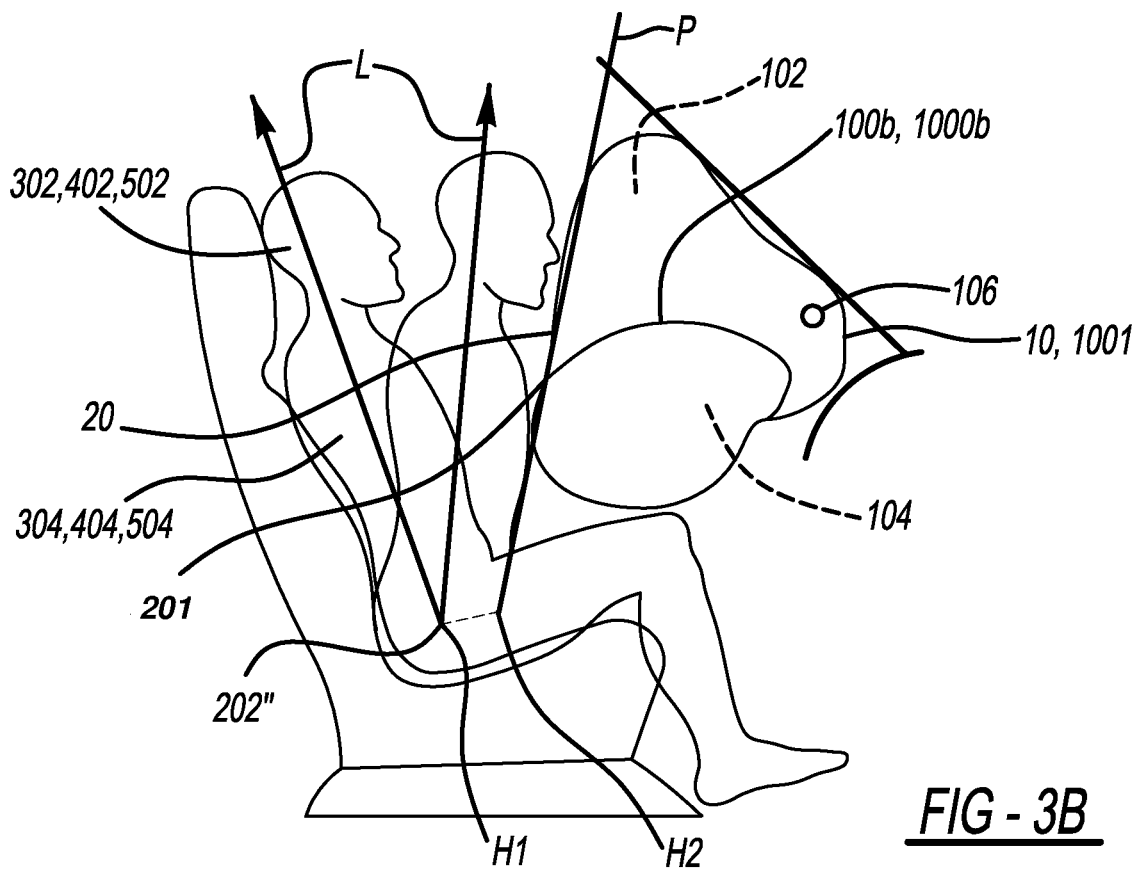
FIG. 3B is a side view of the airbag of FIG. 1 mounted and deployed in a vehicle in front of a seated passenger.

In the embodiments described herein, the various airbag elements are shaped and connected to each other so that, when fully inflated, the front side 20 of the bag aids in maintaining alignment of the head, neck, and thoracic body regions along a line L as shown in FIG. 3B during impact with the airbag and after contact with the bag. It is desirable to maintain this alignment during and after contact with the bag, so that the entire upper body of the passenger (i.e., the head, neck, and thoracic regions) effectively pivots about the hip axis of the passenger, as shown in FIG. 3B. To this end, as seen in FIG. 3B, the bag is structured such that the portions of the inflated bag front side 20 contacted by the passenger form an essentially flat plane, indicated by the line P in the drawing. It is also desirable that the line L along which these body regions lie be parallel with the plane P during and after impact with the airbag, to aid in preventing differential motion of the head/neck region and the thorax region (i.e., a bending of the neck and head regions relative to the thorax).

FIG. 1 is a view of one embodiment of a passenger-side airbag 10 (in an inflated state). The airbag embodiment shown in FIG. 1 is formed from three panels. Specifically, the airbag is formed of a main panel 12, a left side (when viewing the airbag from a seated position) panel 14, and a right side panel 16 opposite the right side panel 14. Each of the side panels 14, 16 is generally planar when the airbag 10 is not inflated. Main panel 12 and side panels 14 and 16 combine to define an outer shell of the airbag. The main panel 12 connects the left and right panels and wraps around the airbag 10. As a result, the entirety of the left edge of the main panel 12 is connected along a seam 70 (e.g., by stitching, sewing, adhesive attachment or other suitable means) to the left panel 14 and the entirety of the right edge of the main panel 12 is connected along a seam 72 (e.g., by stitching, sewing, or other suitable means) to the right panel 16.

The main panel 12 has both a front impact side 20 and a rear inflation side 22. Side panels 14 and 16 and main panel 12 also combine to define a mouth 22a of the airbag through which gas is injected into the airbag. After wrapping around the airbag 10, ends of the main panel 12 and the side panels 14 and 16 combine to define opening 22a through which inflation gases are introduced into an interior of the airbag. In addition, the rear inflation side 22 may have slits (not shown) which are sized to receive therein a portion of an inflator (not shown), and/or may also include holes (not shown) which are sized to receive bolts (or other suitable fasteners) that are configured to secure the airbag 10 to the body of an automobile (or other device). Portions of one or more of panels 12, 14, 16 defining upper chamber 102 may also incorporate therein one or more vents (shown schematically as elements 210 and 212) to release gas from the upper chamber in a controlled manner during contact between a passenger and the airbag.

Referring to FIGS. 1-4, a divider 100 is stitched or otherwise suitably attached along a perimeter thereof to interior surfaces of the main, left and right airbag panels. In the embodiment shown in FIGS. 1-4, the divider 100 is attached to the interior surfaces of the panels 12, 14 and 16 so as to form a gas-tight seal between the divider and the various panels to which it is attached. However, in alternative embodiments, at least a portion of the divider 100 may be unattached to one or more of side panels 14 and 16. Divider 100 acts to divide the interior of the airbag into an upper chamber 102 and a lower chamber 104. In the embodiments described herein, the divider 100 is structured and attached to the panels 12, 14 and 16 such that the inflated volume of the lower chamber 104 is greater than the inflated volume of the upper chamber 102. However, in alternative embodiments, the divider 100 may be structured and attached to the panels 12, 14 and 16 such that the inflated volume of the lower chamber 104 is equal to or less than the inflated volume of the upper chamber 102.

In the embodiment shown in FIGS. 1-4, divider 100 has a first portion 100a and a second portion 100b joined to the first portion at a bend or fold 200. First portion 100a is attached to a front portion of main panel 12 along a seam 201 and to side panels 14 and 16 along seams 801 and 803, respectively. In the embodiment shown, the first and second divider portions 100a and 100b are attached to the main panel by attaching fold 200 to the main panel along the seam 201. Thus, in the embodiment shown, divider 100 is generally "V"-shaped, with the fold or line of intersection 200 of the first and second portions attached to the front portion or occupant contact side of the airbag main panel 12, and the first and second portions extending from the fold. First portion 100a is also attached to a rear portion of main panel 12 along a seam 203 residing above gas inlet or mouth 22a. Thus attached to panels 12, 14 and 16, the first divider portion 100a define a boundary of an upper airbag chamber 102.

Second portion 100b is attached to a front portion of main panel 12 along seam 201 (or along a different seam located proximate seam 201) and to side panels 14 and 16 along seam(s) 805 and 807, respectively, positioned to reside below the seam(s) attaching the first portion 100a to the airbag panels, when the airbag is mounted in a vehicle and inflating (or in an inflated condition). Second portion 100b is also attached to a rear portion of main panel 12 along a seam 205 residing below gas inlet or mouth 22a. Thus attached to panels 12, 14 and 16, the second divider portion 100a define a boundary of a lower airbag chamber 104.

In another aspect of the divider configuration described herein, a minimum separation distance between divider first portion 100a and second portion 100b is denoted by dimension D5 at the seams 203 and 205 where the divider portions 100a and 100b, respectively, are attached to rear portions of main panel 12. It may be seen that this separation distance narrows or diminishes in a direction M proceeding from the gas-inlet portion of the airbag toward the occupant contact or front impact side 20 of the airbag. Thus, the first and second divider portions tend to converge in a direction extending from an inflation side of the airbag toward an occupant contact side of the airbag. In the particular embodiment shown in FIGS. 1-4, the separation distance between the first and second divider portions reduces to essentially zero when proceeding in direction M, because the first and second portions 100a and 100b intersect and are attached to the main panel 12 at fold 200, along the occupant contact side 20 of the airbag.

When the divider 100 is attached to the airbag panels 12, 14 and 16 as shown, the first and second portions 100a and 100b of the divider 100, the side panels 14 and 16, and the rear portion of main panel 12 combine to define a receiving chamber 101 positioned intermediate upper chamber 102 and lower chamber 104.

First portion 100a also has an opening 110 formed therein to enable fluid communication between opposite sides of the first portion through the opening. In the particular embodiment shown in FIGS. 1-4, opening 110 lies along a central longitudinal plane L of the airbag. However, the opening 110 may be positioned at any suitable location along the extent of first portion 100a, depending on the requirements of a particular application. In addition, the divider first portion 100a may have multiple openings if desired, according to the requirements of a particular application.

Second portion 100b also has a plurality of openings 112 formed therein to enable fluid communication between opposite sides of the second portion through the openings. In the particular embodiment shown in FIGS. 1-4, second portion has two openings 112a and 112b, each opening being positioned to either side of the central longitudinal plane L of the airbag. However, the openings 112a and 112b (or any other number of openings) may be positioned at any suitable locations along the extent of second portion 100b, depending on the requirements of a particular application.

Any of openings 110, 112a, 112b may incorporate or have operatively coupled thereto a flow control valve (not shown) which enables gas flow from receiving chamber 101 into an associated upper chamber 102 and lower chamber 104, and which restricts flow back into the receiving chamber 101 from upper chamber 102 and lower chamber 104. Examples of flow control valves suitable for this purpose may be found in U.S. application Ser. No. 14/452,016 and U.S. application Ser. No. 14/458,153, the disclosures of which are hereby incorporated by reference. Other valves suitable for this application may also be employed.

Chamber 101 receives gases from an inflator or other pressurized fluid source (not shown) entering the airbag through gas inlet or mouth 22a. The received gases then flow from receiving chamber 101 simultaneously into upper chamber 102 and lower chamber 104, through associated openings 110, 112a and 112b. In this respect, divider 100 acts as a diffuser, dividing and directing the gas flow from the fluid source into the upper and lower chambers.

Figure 2:
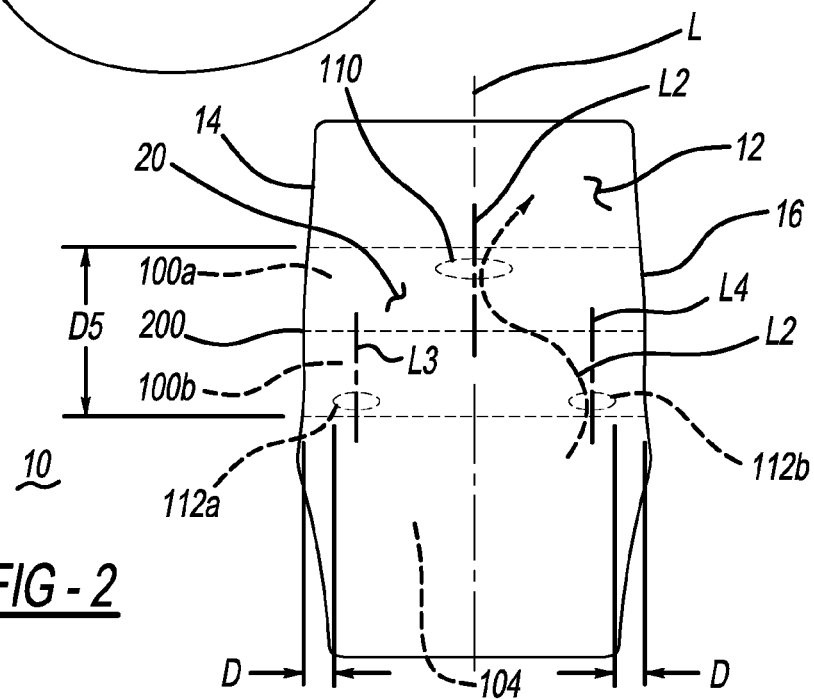
FIG. 2 is a front view of the airbag of FIG. 1.
Figure 4:
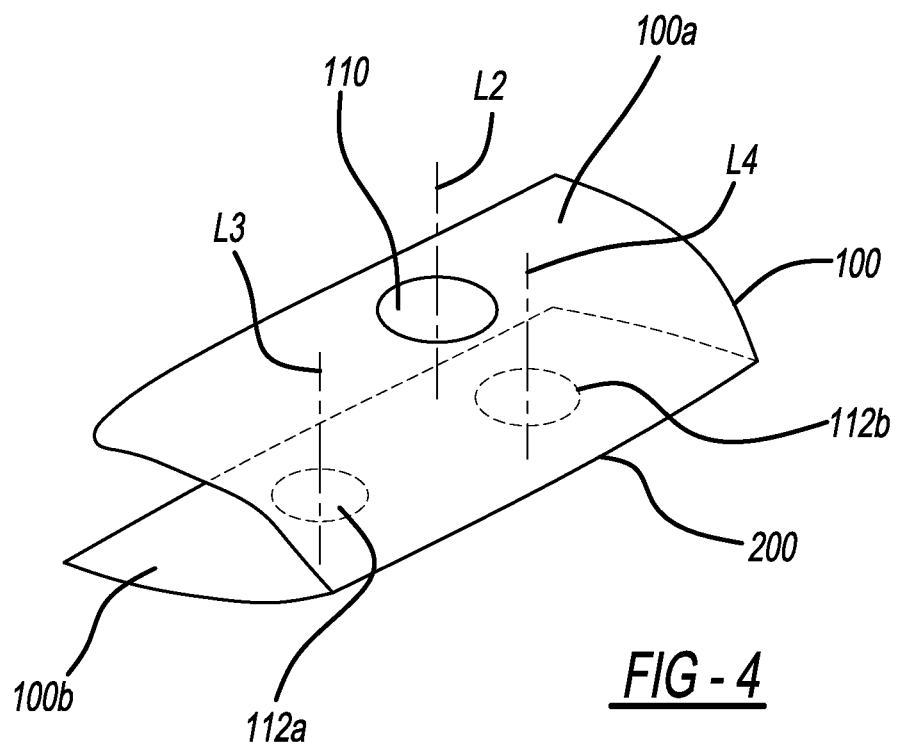
FIG. 4 is a perspective view of an airbag divider in accordance with an embodiment described herein.

It is also seen from FIGS. 2 and 4 that vertical axes L2, L3 and L4 passing through centers of openings 110, 112a and 112b, respectively, when the airbag is in an inflated condition, are laterally spaced apart from each other (in a direction extending from one of side panels 14 and 16 toward the other of side panels 14 and 16).

In a particular embodiment, the sizes of openings 112a and 112b are different, thereby enabling the side of the airbag and portion of the lower chamber 104 adjacent the relatively larger opening to be filled more rapidly than the portion of the lower chamber adjacent the relatively smaller opening. This mechanism enables greater control over the order in which designated portions of the bag become fully inflated, as well as control over the rate at which the portions of the bag fill.

It may also be seen that the ability to specify the size and/or positions of each of the various openings 110, 112a and 112b enables independent and simultaneous control of each of the gas flow rate from the receiving chamber 101 into the lower chamber 104 and the gas flow rate from the receiving chamber 101 into the upper chamber 102.

Divider first and second portions 100a and 100b may be formed as a single, continuous sheet of material which is folded along a divider fold 200, which is then stitched or otherwise attached to the front or occupant contact side 20 of main panel 12. Alternatively, the divider portions 100a and 100b may be formed separately and attached to the airbag panels 12, 14 and 16 as described herein. In addition, divider portions 100a and 100b may be attached to main panel 12 along the same seam or along different seams. Panels 12, 14 and 16 and divider 100 may be formed in a known manner from gas-impermeable fabric(s) or other suitable gas-impermeable material(s).

The number, sizes and locations of openings of the openings in first portion 100a and second portion 100b may be adjusted so as to achieve a desired bag inflation profile. In the embodiments shown herein, the various openings 110, 112a and 112b may be sized to regulate or control the flow rates of gases therethrough, with openings having a relatively larger area enabling a relatively larger flowrate and openings having a relatively smaller area enabling a relatively smaller flowrate or more constricted flow. More specifically, appropriate sizing of openings 112a and/or 112b can be employed to affect the flow rate of gases from receiving chamber 101 into lower chamber 104, thereby affecting the fill rate of the lower chamber. Similarly, appropriate sizing of opening 110 can be employed to affect the flow rate of gases from receiving chamber 101 into upper chamber 102, thereby affecting the fill rate of the upper chamber. In this manner, the various openings 110, 112a and 112b may be sized so that the airbag upper and lower chambers inflate from the receiving chamber 101 at different rates, and the fill rates of the upper and lower chambers can be adjusted with respect to each other to achieve a desired bag inflation profile.

In the embodiment shown in FIGS. 1-4, opening 110 in divider first portion 100a is positioned along central plane L. In this location, opening 110 facilitates a relatively rapid flow of gases from the centrally located airbag mouth 22a through the receiving chamber 101 and up into the upper chamber 102. Thus, this opening location aids in minimizing the time required to fill the upper chamber, thereby decreasing the time between the occurrence of a collision event activating the airbag and contact between an adult passenger and the upper portion of the airbag.

In the embodiment shown in FIGS. 1-4, the openings 112a and 112b are spaced apart from central plane L and are each located a relatively short, predetermined distance D along divider second portion 100b from a respective one of airbag side panels 14 and 16.

Figure 5:
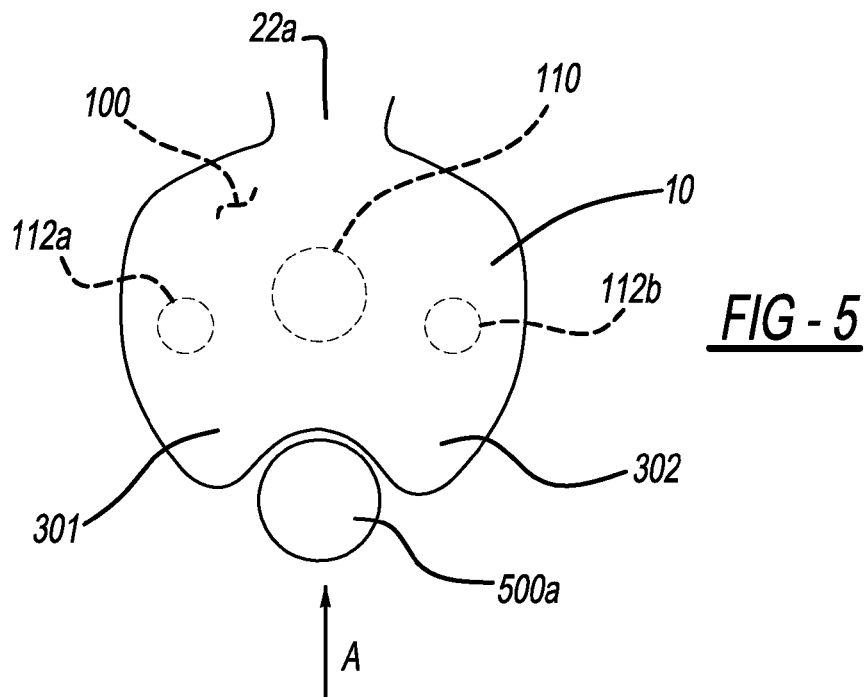
FIG. 5 is an overhead schematic view of a passenger impacting an airbag incorporating a divider in accordance with an embodiment described herein.

Positioned at these locations, openings 112a and 112b channel inflation gases from receiving chamber 101 into lower chamber 104 and along the side panels, so that the regions of lower chamber 104 located along the side panels 14 and 16 inflate more rapidly than the inner portions of the chamber. This inflation of the lower chamber from the outer portions inward allows the more-rapidly filling side portions of the airbag to deflect and rapidly form lobes 301 and 302 in response to impact of the head 500a of an out-of-position child passenger 500 on the bag, in the direction indicated by arrow "A" of FIG. 5. These lobes act to "cup" or partially enclose the head the child, as shown schematically in FIG. 5.

In particular embodiments, one or more of openings 112a and 112b is formed along a respective side edge of the divider second portion, in which case the opening is bounded by the divider second portion and the airbag side panel to which it is attached.

FIG. 9A shows a portion of airbag 100 during inflation of the airbag. FIG. 9B shows the airbag portion of FIG. 9A during contact of a vehicle occupant with the airbag. Opening 110 may be offset laterally from each of openings 112a and 112b, as shown in FIG. 2. Referring to FIGS. 9A and 9B, in particular embodiments, the divider 100 is structured so that opening 110 is also offset from each of openings 112a and 112b in a direction of the fore-aft axis of the vehicle when the airbag is in an inflated condition. either of divider second portion openings 112a and 112b may be positioned in any desired location between an edge of the divider second portion adjacent a side panel (as determined by dimension D) and a plane passing through an edge of the opening 110 closest to the second portion opening. That is, the openings 110, 112a and 112b are positioned along the divider so that no edges of either of openings 112a and 112b overlap with any edges of opening 110 along a vertical axis or in a vertical direction when the airbag is in an inflated condition. Such an arrangement is shown in FIG. 2 with regard to openings 110, 112a and 112b. As shown in FIG. 9A, this non-alignment of the divider openings permits flow between the various chambers 101, 201 and 104 during airbag inflation. However, as shown in FIG. 9B, when a vehicle occupant contacts the airbag, the divider 100 is compressed in a direction toward the front of the vehicle. This compression produces slack in the divider first and second portions 100a and 100b, enabling the divider portions to more closely approach each other and to contact each other. When the divider portions contact each other, flow between chambers 102 and 104 through the openings 110, 112a and 112b is impeded or restricted due to the non-alignment of the openings. This flow restriction enables zones of relatively stable internal pressure to be established in the chambers 102 and 104 during airbag loading due to contact with the occupant.

The opening 110 is spaced apart from front impact side 20 a predetermined distance D1 along divider first portion 100a. In a particular embodiment, the openings 112a and 112b are spaced apart from front impact side 20 a predetermined distance D2 along divider second portion 100b, to facilitate formation and proper shaping of the lobes 301 and 302 during airbag inflation.

In particular embodiments, the opening 112a may be spaced apart from side panel 14 a different distance than opening 112b is spaced apart from side panel 116.

In particular embodiments, the opening 112a may be spaced apart from front impact side 20 a different distance than opening 112b is spaced apart from the front impact side.

In the embodiment shown, openings 112a and 112b are the same size, to provide substantially gas flowrates along both side panels 14 and 16 into lower chamber 104. In other embodiments, the sizes of openings 112a and 112b may be different, to preferentially fill one side of the lower chamber more rapidly than the other side, depending on the requirements of a particular application.

In the embodiment shown in FIGS. 1-4, the openings 110, 112a and 112b are sized and/or positioned so as to create a "throttling" effect on gases tending to flow out of lower chamber 104 through receiving chamber 101 and into upper chamber 102, responsive to a pressure surge in the lower chamber resulting from the impact of a vehicle passenger on the lower portion of the airbag. The combined sizes of the openings 112a and 112b and the size of opening 110 may be specified in relation to each other such that the combined flow rate of gases through the openings 112a and 112b and into chamber 101 exceeds the rate at which gases under the same pressure can flow through opening 110. This disparity in the sizes of the openings produces a back pressure during airbag inflation, which slows or delays the flow of gases from the lower chamber to the upper chamber responsive to passenger impact on the lower portion of the airbag, thereby maintaining the gases and elevated pressure within the lower chamber for a longer period.

In addition, as seen in FIG. 2, because opening 110 is not aligned with either of openings 112a and 112b along a flow path of gases out of the openings 112a and 112b, the flow path length L2 of gases from openings 112a and 112b to opening 110 is relatively longer than the path would be if the openings were closer together or more closely aligned (for example, along plane L). This causes an additional delay in the flow of gases between the lower chamber and the upper chamber.

Figure 6:
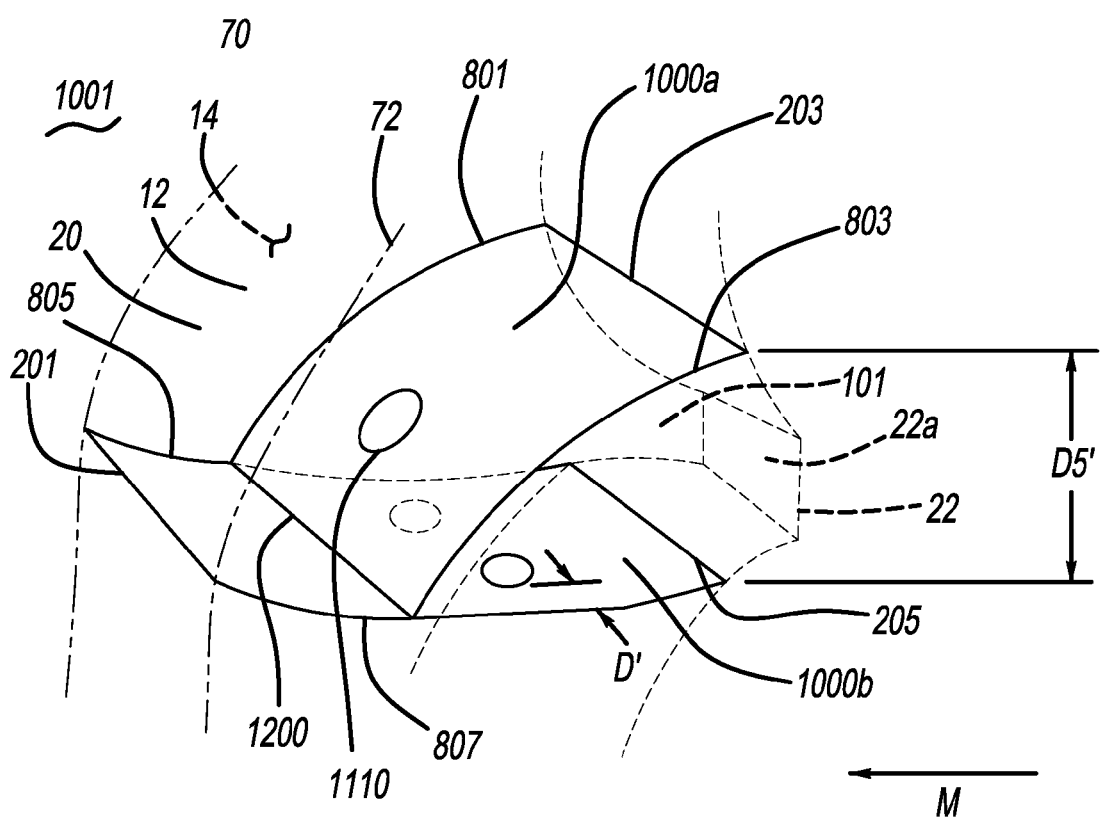
FIG. 6 is a schematic perspective view of a passenger-side airbag (in an inflated state) incorporating an airbag divider in accordance with another embodiment described herein.
Figure 7:
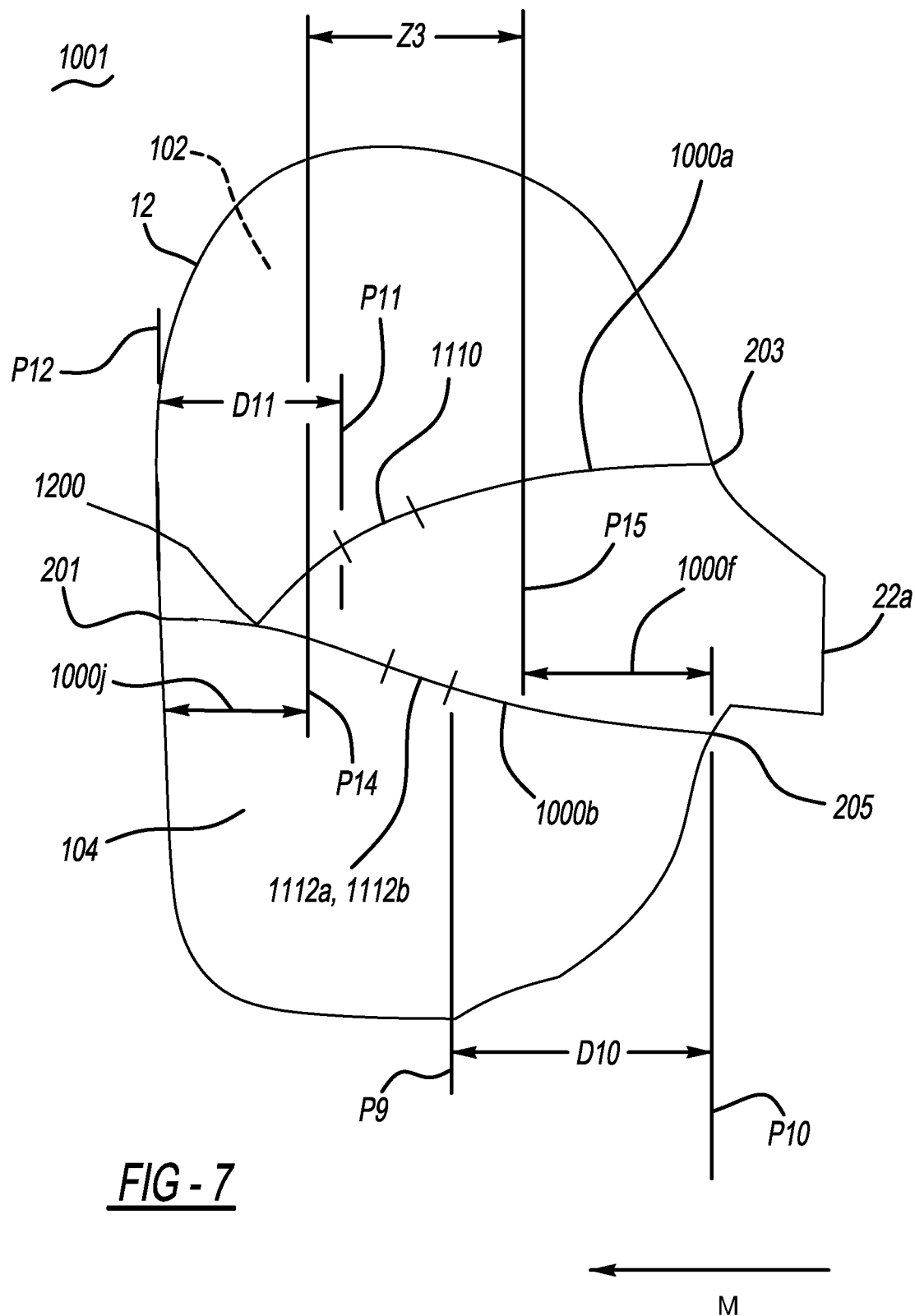
FIG. 7 is a side schematic view of the airbag of FIG. 6.

FIGS. 6-8 show alternative embodiments of the divider. In the embodiments shown in FIGS. 6-8, the exterior portions of the airbag are similar to those previously described herein, and in FIG. 6 these exterior portions are shown in phantom.

Referring to FIGS. 6-7, an alternative embodiment of the airbag 1001 and divider 1000, the divider is stitched or otherwise suitably attached along a perimeter thereof to interior surfaces of the main, left and right airbag panels. The divider 1000 is attached to the interior surfaces of the panels 12, 14 and 16 as previously described with respect to the embodiment shown in FIGS. 1-4 so as to form a gas-tight seal between the divider and the various panels to which it is attached. However, in alternative embodiments, at least a portion of the divider 100 may be unattached to one or more of side panels 14 and 16. Divider 1000 acts to divide the interior of the airbag into an upper chamber 102 and a lower chamber 104. In the embodiments shown, the divider 1000 is structured and attached to the panels 12, 14 and 16 such that the inflated volume of the lower chamber 104 is greater than the inflated volume of the upper chamber 102. However, in alternative embodiments, the divider 1000 may be structured and attached to the panels 12, 14 and 16 such that the inflated volume of the lower chamber 104 is equal to or less than the inflated volume of the upper chamber 102.

In the embodiment shown in FIGS. 6-7, divider 1000 has a first portion 1000a and a second portion 1000b as previously described, with first portion 1000a joined to the second portion at a connecting seam 1200 spaced apart from impact side 20 of main panel 12. First portion 1000a is also attached to side panels 14 and 16 along seams 801 and 803, respectively. First portion 1000a is also attached to a rear portion of main panel 12 along a seam 203 residing above gas inlet or mouth 22a. Thus attached to panels 12, 14 and 16, the first divider portion 1000a and the portion of second divider portion 1000b residing between seam 1200 and occupant contact side 20 define a boundary of upper airbag chamber 102.

Second portion 1000b is attached along a gas-tight seam 201 to main panel 12 along occupant contact side 20, and to side panels 14 and 16 along gas-tight seam(s) 805 and 807, respectively, positioned to reside below the seam(s) attaching the first portion 1000a to the airbag panels when the airbag is mounted in a vehicle and inflating (or in an inflated condition). Second portion 1000b is also attached to a rear portion of main panel 12 along a seam 205 residing below gas inlet or mouth 22a. Thus attached to panels 12, 14 and 16, the second divider portion 1000a defines a boundary of a lower airbag chamber 104.

In another aspect of the divider configuration described herein, a minimum separation distance between divider first portion 1000a and second portion 100b is denoted by dimension D5' at the seams 203 and 205 where the divider portions 1000a and 1000b, respectively, are attached to rear portions of main panel 12. It may be seen that this separation distance narrows or diminishes in a direction M proceeding from the gas-inlet portion of the airbag toward the occupant contact or front impact side 20 of the airbag. Thus, the first and second divider portions tend to converge in a direction extending from an inflation side of the airbag toward an occupant contact side of the airbag. In the particular embodiment shown in FIGS. 6 and 7, the separation distance between the first and second divider portions reduces to essentially zero when proceeding in direction M, because the first and second portions 1000a and 1000b intersect at seam 1200.

When the divider 1000 is attached to the airbag panels 12, 14 and 16 as shown, the first and second portions 1000a and 1000b of the divider 1000, the side panels 14 and 16, and the rear portion of main panel 12 combine to define a receiving chamber 101 positioned intermediate upper chamber 102 and lower chamber 104.

First portion 1000a also has an opening 1110 formed therein to enable fluid communication between opposite sides of the first portion through the opening. In the particular embodiment shown in FIGS. 6 and 7, opening 1110 lies along a central longitudinal plane L of the airbag as previously described with regard to opening 110 of FIGS. 1-4. However, the opening 1110 may be positioned at any suitable location along the extent of first portion 1000a, depending on the requirements of a particular application. In addition, the divider first portion 1000a may have multiple openings if desired, according to the requirements of a particular application.

Second portion 1000b also has a plurality of openings 1112 formed therein to enable fluid communication between opposite sides of the second portion through the openings. In the particular embodiment shown in FIGS. 6 and 7, second portion has two openings 1112a and 1112b, each opening being positioned to either side of the central longitudinal plane L of the airbag as previously described with regard to openings 112a and 112b of FIGS. 1-4. However, the openings 1112a and 1112b (or any other number of openings) may be positioned at any suitable locations along the extent of second portion 1000b, depending on the requirements of a particular application.

Any of openings 1110, 1112a, 1112b may incorporate or have operatively coupled thereto a flow control valve (not shown) which enables gas flow from receiving chamber 101 into an associated upper chamber 102 and lower chamber 104, and which restricts flow back into the receiving chamber 101 from upper chamber 102 and lower chamber 104. Examples of flow control valves suitable for this purpose may be found in U.S. application Ser. No. 14/452,016 and U.S. application Ser. No. 14/458,153. Other valves suitable for this application may also be employed.

Chamber 101 receives gases from an inflator or other pressurized fluid source (not shown) entering the airbag through gas inlet or mouth 22a. The received gases then flow from receiving chamber 101 simultaneously into upper chamber 102 and lower chamber 104, through associated openings 1110, 1112a and 1112b. In this respect, divider 1000 acts as a diffuser, dividing and directing the gas flow from the fluid source into the upper and lower chambers.

In addition, in a manner similar to that shown in FIGS. 2 and 4, vertical axes passing through centers of openings 1110, 1112a and 1112b are laterally spaced apart from each other (in a direction extending from one of side panels 14 and 16 toward the other of side panels 14 and 16) when the airbag is in an inflated condition.

In a particular embodiment, the sizes of openings 1112a and 1112b are different, thereby enabling the side of the airbag and portion of the lower chamber 104 adjacent the relatively larger opening to be filled more rapidly than the portion of the lower chamber adjacent the relatively smaller opening. This mechanism enables greater control over the order in which designated portions of the bag become fully inflated, as well as control over the rate at which the portions of the bag fill.

It may also be seen that the ability to specify the size and/or positions of each of the various openings 1110, 1112a and 1112b enables independent and simultaneous control of each of the gas flow rate from the receiving chamber 101 into the lower chamber 104 and the gas flow rate from the receiving chamber 101 into the upper chamber 102.

Panels 12, 14 and 16 and divider 1000 may be formed in a known manner from gas-impermeable fabric(s) or other suitable gas-impermeable material(s).

The number, sizes and locations of openings of the openings in first portion 1000a and second portion 1000b may be adjusted so as to achieve a desired bag inflation profile.

In the embodiments shown herein, the characteristics of the various flow control valves operatively coupled to openings 1110, 1112a and 1112b and the sizes of the openings may be specified so as to regulate or control the flow rates of gases therethrough, with openings having a relatively larger area enabling a relatively larger flowrate and openings having a relatively smaller area enabling a relatively smaller flowrate or more constricted flow. More specifically, appropriate valve structures and sizing of openings 1112a and/or 1112b can be employed to affect the flow rate of gases from receiving chamber 101 into lower chamber 104, thereby affecting the fill rate of the lower chamber. Similarly, appropriate valve structures and sizing of opening 1110 can be employed to affect the flow rate of gases from receiving chamber 101 into upper chamber 102, thereby affecting the fill rate of the upper chamber. In this manner, the characteristics of openings 1110, 1112a and 1112b and their associated flow control valves may be specified so that the airbag upper and lower chambers inflate from the receiving chamber 101 at different rates, and the fill rates of the upper and lower chambers can be adjusted with respect to each other to achieve a desired bag inflation profile.

In the embodiment shown in FIGS. 6 and 7, opening 1110 in divider first portion 1000a is positioned along airbag central plane L. In this location, opening 1110 facilitates a relatively rapid flow of gases from the centrally located airbag mouth 22a through the receiving chamber 101 and up into the upper chamber 102. Thus, this opening location aids in minimizing the time required to fill the upper chamber, thereby decreasing the time between the occurrence of a collision event activating the airbag and contact between an adult passenger and the upper portion of the airbag.

In the embodiment shown in FIGS. 6 and 7, the openings 1112a and 1112b are spaced apart from the central plane L and are each located a relatively short, predetermined distance D' along divider second portion 100b from a respective one of airbag side panels 14 and 16.

Positioned at these locations, openings 1112a and 1112b channel inflation gases from receiving chamber 101 into lower chamber 104 and along the side panels, so that the regions of lower chamber 104 located along the side panels 14 and 16 inflate more rapidly than the inner portions of the chamber. This inflation of the lower chamber from the outer portions inward allows the more-rapidly filling side portions of the airbag to deflect and rapidly form lobes 301 and 302 in response to impact of the head 500a of an out-of-position child passenger 500 on the bag, in the direction indicated by arrow "A" of FIG. 5. These lobes act to "cup" or partially enclose the head the child, as shown schematically in FIG. 5.

In particular embodiments, one or more of openings 112a and 112b is formed along a respective side edge of the divider second portion, in which case the opening is bounded by the divider second portion and the airbag side panel to which it is attached.

FIG. 10A shows a portion of airbag 1001 during inflation of the airbag. FIG. 10B shows the airbag portion of FIG. 10A during contact of a vehicle occupant with the airbag. Opening 1110 may be offset laterally from each of openings 1112a and 1112b, in a manner similar to that shown in FIG. 2 with regard to openings 110, 112a and 112b. Referring to FIGS. 10A and 10B, in particular embodiments, the divider 1000 is structured so that opening 1110 is also offset from each of openings 1112a and 1112b in a direction of the fore-aft axis of the vehicle when the airbag is in an inflated condition. Either of divider second portion openings 1112a and 1112b may be positioned in any desired location between an edge of the divider second portion adjacent a side panel (as determined by dimension D') and a plane passing through an edge of the opening 1110 closest to the second portion opening. That is, the openings 1110, 1112a and 1112b are positioned along the divider so that no edges of either of openings 1112a and 1112b overlap with any edges of opening 1110 along a vertical axis or in a vertical direction when the airbag is in an inflated condition. Such an arrangement is shown in FIG. 2 with regard to openings 110, 112a and 112b. As shown in FIG. 10A, this non-alignment of the divider openings permits flow between the various chambers 101, 201 and 104 during airbag inflation. However, as shown in FIG. 10B, when a vehicle occupant contacts the airbag, the divider 1000 is compressed in a direction toward the front of the vehicle. This compression produces slack in the divider first and second portions 1000a and 1000b, enabling the divider portions to more closely approach each other and to contact each other. When the divider portions contact each other, flow between chambers 102 and 104 through the openings 1110, 1112a and 1112b is impeded or restricted due to the non-alignment of the openings. This flow restriction enables zones of relatively stable internal pressure to be established in the chambers 102 and 104 during airbag loading due to contact with the occupant.

The locations of openings 110, 112a and 112b (of FIGS. 1-4) and the locations of openings 1110, 1112a and 1112b (of FIGS. 6-8) may be determined in a manner similar to that set forth in the description of FIGS. 15-17 of U.S. application Ser. No. 14/212,701, filed on Mar. 14, 2014, the disclosure of which is hereby incorporated by reference in its entirety. Although the following characteristics of the embodiments disclosed herein are described with reference to the embodiment shown in FIGS. 6-8, the description applies equally to the embodiment shown and described with reference to FIGS. 1-4, including divider openings 110, 112a and 112b.

In particular embodiments, associated valve mechanisms (not shown) control and provide directional gas flow through one or more of openings 1110, 1112a and 1112b. With regard to FIGS. 6 and 7, it has been found that airbag performance after activation and during filling is affected by the distance D10 taken between a vertical plane P10 extending through the seam 205 (where the divider second portion is attached to the main panel 12 adjacent the airbag mouth 22a) when the airbag is in a fully inflated state (as shown in FIG. 7), and the location(s) of any edge(s) of any of openings 1110, 1112a and 1112b closest to the plane P10 when the airbag is in the inflated state. The distance D10 may be taken as the shortest distance between plane P10 and a vertical plane P9 passing through the closest edge(s) of any of openings 1110, 1112a and 1112b when the airbag is in the inflated state. More specifically, if any edges of the openings 1110, 1112a and 1112b are located closer to the inflator side 22 of the airbag than a predetermined distance 1000f (as defined by a vertical plane P15) from plane P10, the movements of the components of valve mechanisms controlling gas flow through the openings 1110, 1112a and 1112b may be constricted by proximity to the vehicle instrument panel profile, thereby impairing valve operation.

Airbag performance after activation and during filling is also affected by the distance D11 between a vertical plane P12 passing through the seam 201 (along which divider second portion 1000b is attached to occupant contact face 20 of the airbag) when the airbag is in a fully inflated state (as shown in FIG. 7), and the location(s) of any edge(s) of any of openings 1110, 1112a and 1112b closest to the plane P12 when the airbag is in the inflated state. The distance D11 may be taken as the shortest distance between plane P12 and a vertical plane P11 passing through the closest edge(s) of any of openings 1110, 1112a and 1112b when the airbag is in the inflated state. More specifically, if any edges of any of the openings 1110, 1112a and 1112b are located nearer to the occupant contact side 20 of the cushion than a predetermined distance 1000j (defined by a vertical plane P14) from the occupant contact side (as measured from the plane P12, the airbag will have a tendency to pull excessively downward during inflation of the upper chamber 102, thereby pulling the airbag out of the desired alignment with the passenger's body prior to contact between the passenger and the inflating airbag.

Thus, at locations along the divider between planes P14 and P15 is an interval or zone in which the openings 1110, 1112a and 1112b should be positioned to achieve adequate gas flow to fill the lower chamber.

While movement of the edge(s) of openings 1110, 1112a and 1112b past the distance 1000j and farther away from the front portion of the main panel 12 mitigates excessive downward pull of the airbag during the initial stages of inflation, thereby improving the overall performance of the bag with respect to an adult occupant, this positioning of the opening(s) may result in less-than-optimum performance for Out of Position-1 children. There is a balance between these requirements which may be tuned for a specific vehicle or specific application in order to achieve the best overall performance both early and later in the deployment event, and for both types of passenger. Between planes P14 and P15 lie an optimal location or locations for tuning the initial cushion fill and cushion pitch to achieve the desired results for a given application. The exact desired location of the opening (or openings) 1110, 1112a and 1112b for a particular application may be determined iteratively, by experimentation, or analytically.

In particular embodiments of the airbag, it is desired to position the opening(s) 1110, 1112a and 1112b along the divider 1000 so that, during inflation, the airbag reacts with a child passenger in a predetermined manner. More specifically, the opening(s) 1110, 1112a and 1112b are positioned along the divider such that, as the upper chamber fills in the initial stage of deployment, the bag upper chamber 102 inflates above the top of the head 700a of a Hybrid III 3 and 6-Year Old Anthropomorphic Test Device (ATD) (generally designated 700) when the head is positioned resting against or proximate the vehicle instrument panel at a location specified as Position-2 for Out of Position (OOP) testing in accordance with FMVSS Standard No. 208 (which may be found, for example, at http://www.law.cornell.edu/cfr/text/49/571.208), which is incorporated herein by reference in its entirety. The Hybrid III 3 and 6-Year Old test ATD has physical parameters defined by 49 CFR Part 572 (which may be found at http://www.law.cornell.edu/cfr/text/49/part-572), herein incorporated by reference. Position-1 and Position-2 for Out of Position testing is schematically illustrated in FIG. 20 and FIG. 18, respectively, and described in sections 22.4.2 and 22.4.3 of FMVSS208, respectively, the descriptions of which are herein incorporated by reference.

As gases flow into the lower chamber 104 from the receiving chamber 101, the lower chamber 104 inflates in the later stages of deployment so as to occupy a space behind and around the child's head, thereby preventing and/or mitigating harmful interactions between the airbag and the child's head. This inflation progression is shown in FIGS. 7A and 7B.

Figure 7C:
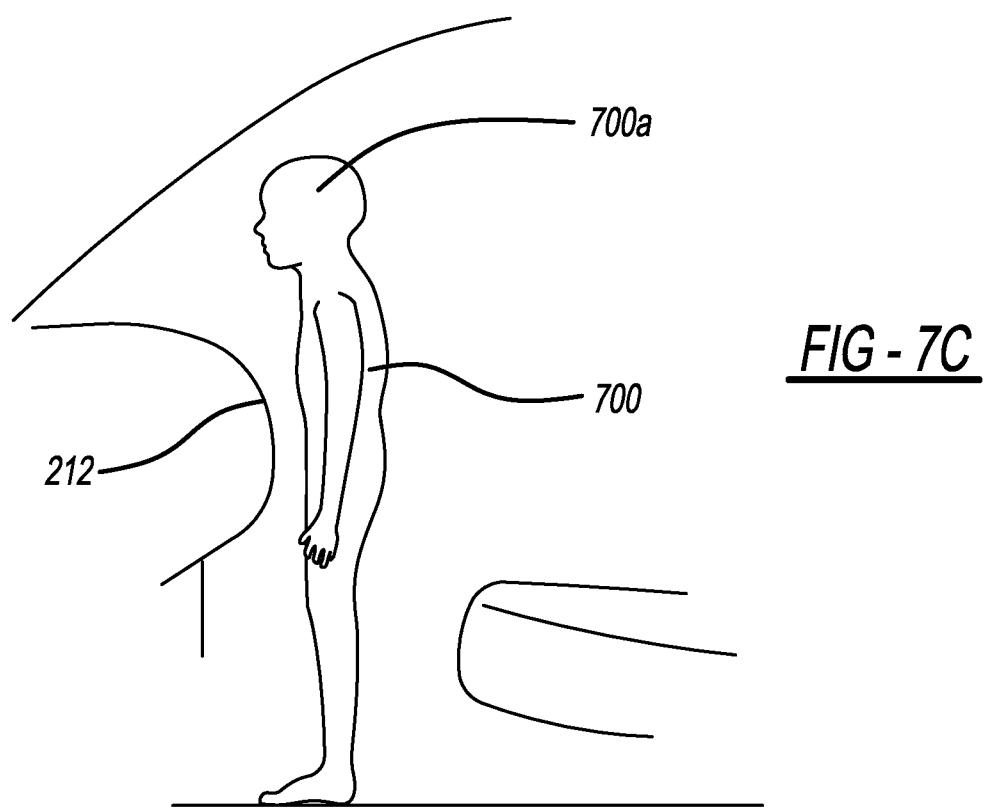
FIG. 7C is a schematic side view of a 3 year-old Anthropomorphic Test Device in Position-1 for Out of Position testing under FMVSS Standard No. 208, prior to activation of a vehicle airbag.
Figure 7D:
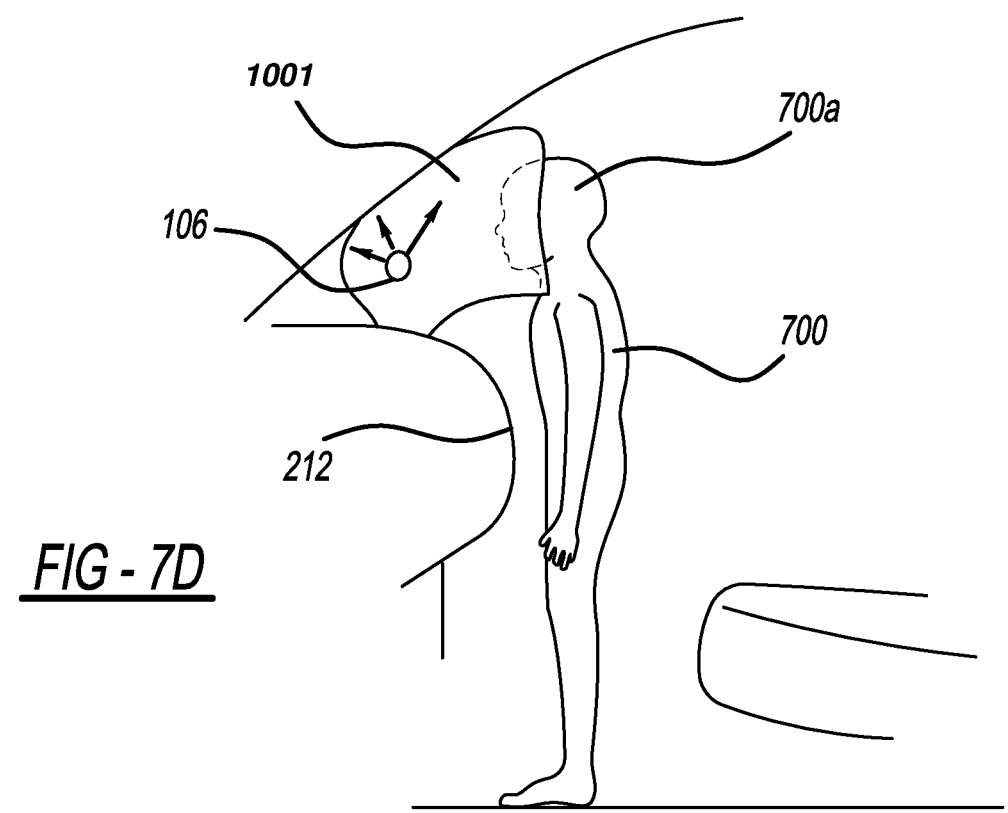
FIG. 7D is a side view of FIG. 7C after activation of a vehicle airbag illustrating the undesired location of the valve mechanism at a point rearward from the occupant or proximate the inflator.

The values of D10, D11, 1000f and other divider opening positioning parameters are determined as a function of the vehicle interior dimensions and the placement of the out-of-position-2 child, according to the previously-mentioned FMVSS208 standards. Practical limitations of the divider opening placement affect the airbag performance for an out-of-position 3-year old or 6-year old child, as defined by FMVSS Standard No. 208. By positioning the divider opening(s) 1110, 1112a and 1112b within the range defined by locations P14 and P15 (i.e., zone Z3) in FIG. 7, the forces exerted by the airbag on both the 3-year old and 6-year old child in Position-1 (shown in FIG. 7C) will be distributed between the child's head and thorax regions. For example, it has been found that when the divider openings 1110, 1112a and 1112b are positioned within a distance 1000j from a seam connecting the divider 1000 with the occupant side of the airbag, the airbag will tend to impact the child when deployed, before completely filling. This contact with the child tends to prevent the gases from flowing into the lower chamber, which may produce greater forces acting on the child. See FIG. 7D that illustrates this configuration, for example. Also, it has been found that when the divider openings 1110, 1112a and 1112b are positioned within a predetermined distance 1000f along the divider from an inflator side 22 of the airbag toward an occupant side of the airbag, the airbag will tend to impact the child when deployed, before completely filling, with the results previously mentioned. In contrast, referring to FIGS. 7E and 7F, it has been found that when the divider opening(s) 1110, 1112a and 1112b are positioned within zone Z3 as previously described, the gases are permitted to flow into the lower chamber without obstruction. This creates a more evenly distributed loading on the child's head and thoracic regions. Also, with this placement of the openings 1110, 1112a and 1112b—and associated valves, the gases can more easily flow out of the vents 106 from the upper chamber. As illustrated in FIG. 7F, P15 is defined by alignment with the out-of position 2 leading edge of the child's head on the instrument panel 212 (per FMVSS208). P14 is aligned with the shoulder bolt 701 of the ATD. Z3 is of course defined as the region spanning between P14 and P15.

Figure 7E:
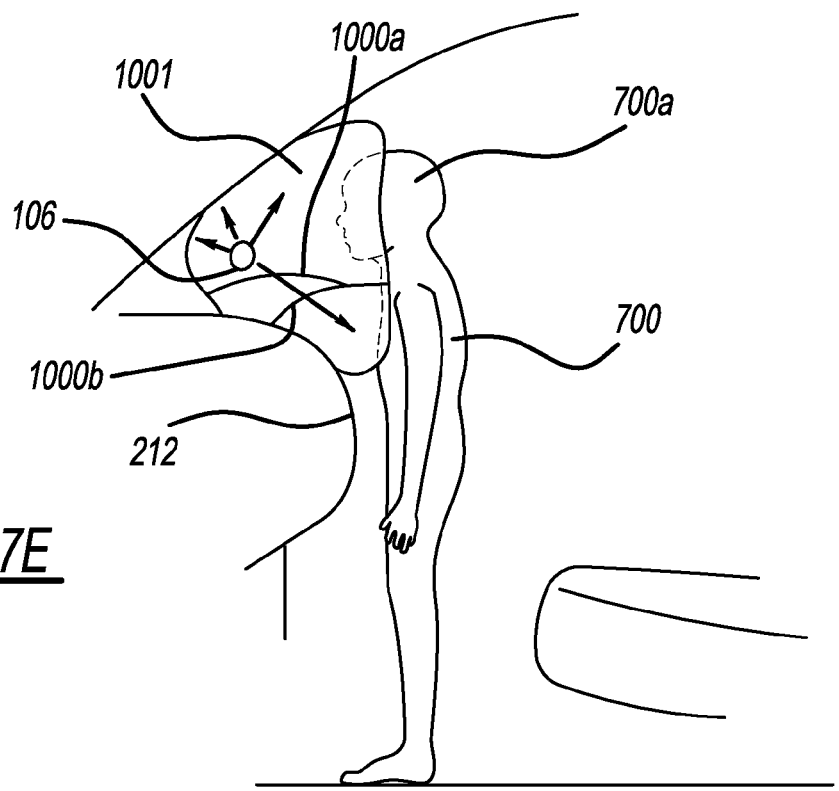
FIG. 7E is a side view of FIG. 7C after activation of a vehicle airbag.
Figure 7F:
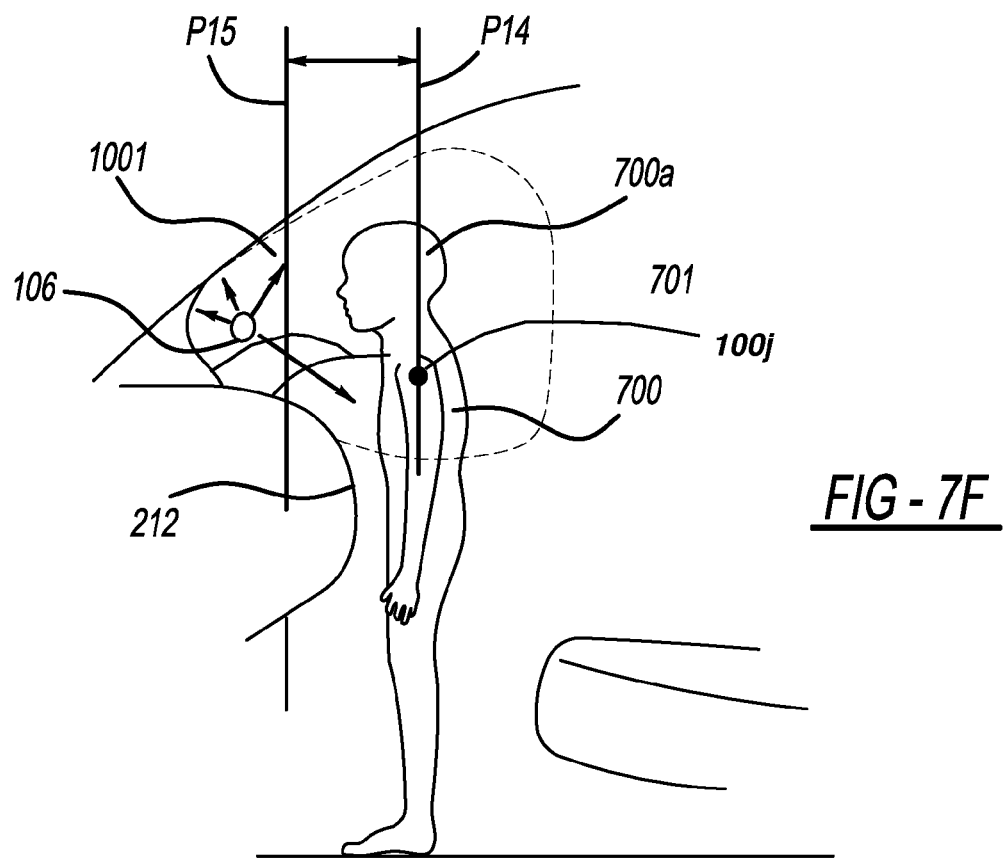
FIG. 7F is a side view of FIG. 7C after activation of a vehicle airbag illustrating the determination of zone 3, Z3, and a desired location of the divider openings and associated valve mechanisms.

Further to FIGS. 7E and 7F, it should be appreciated that the location(s) of the valve mechanism(s) or valve opening (s) 1110, 1112a and 1112b are preferably positioned within Z3 as defined in the deployed airbag. Accordingly, it will be appreciated that as described in the examples given below, the out-of-position 1 and out-of-position 2 FMVSS208 defined above are particularly important in certain embodiments with regard to placement of the openings 1110, 1112a and 1112b. It has unexpectedly been found that placement of openings 1110, 1112a and 1112b within zone 3 or Z3 as defined herein and with reference to a deployed airbag shown in FIG. 7F for example, contributes to effectively managing and mitigating the forces acting on an out-of-position child for example, as indicated in 3-year old and 6-year old H-III ATD testing under FMVSS208. It will be appreciated that although at least one or more openings 1110, 1112a and 1112b should be positioned within Z3 to ensure fluid communication between the upper and lower airbag chambers with regard to airbag contact with an out-of-position child as shown in FIG. 7C (position 1 of FMVSS208), one or more openings 1110, 1112a and 1112b may also be positioned outside of Z3 depending on other design criteria.

Stated another way, it has been found that an optimum inflation profile range and alignment with the passenger's body as shown in FIG. 3B, as well as the bag inflation progression shown in FIGS. 7A and 7B, can be achieved by positioning all divider openings 1110, 1112a and 1112b such that all edges of all the openings reside within the zone bounded by or residing between planes P14 and P15 as defined herein, which may also be defined on one side by a vertical plane P15 shown in FIG. 7A corresponding to a location abutting the front-most portion of the head of the Hybrid III 6-Year Old Anthropomorphic Test Device when the head of the Hybrid III 6-year old is in Position-2 for FMVSS208 Out of Position testing as specified above, and on an opposite side by a vertical plane P14 (see FIG. 7A) as defined herein. As known in the pertinent art, an anthropomorphic test device is a human form in shape, mass and mechanical response, equipped with sensors including accelerometers, deflection sensors and other measurement devices, to simulate the performance of the human body. It is used in the assessment of injury potential in vehicle safety testing. In one embodiment, plane P14 is spaced apart approximately 7 inches from plane P15 toward a rear of the vehicle when the airbag is inflated. This effectively positions the divider opening(s) within a zone enclosing the head of the Hybrid III 6-Year Old ATD. The distance between planes P15 and P14 defines a zone Z3 in which the openings 1110, 1112a and 1112b may be positioned.

It has also been found that a total area of the openings 1110, 1112a and 1112b within a range of 700 square millimeters (achievable using, for example, one opening of approximately 15 mm radius) to 32,000 square millimeters (achievable using, for example, one opening of approximately 100 mm radius opening) is desirable for helping to ensure that airbag performance is within an optimum range. In embodiments of the present invention, which use a directional valve mechanism to facilitate inflow and restrict backflow from the lower chamber to the upper chamber as previously described, the total areas of the divider openings may need to be at or near an upper end of this range of opening sizes 700 to 32,000 square millimeters, to provide the necessary inflation profile given the reduction in flow caused by turbulence and friction in the gases as they flow through the opening(s) and interact with the portions of the valve.

In one embodiment, the openings 1110, 1112a and 1112b are circular. However, the opening(s) can have any desired shape, as long as the total area of the opening(s) is within the range specified above, and as long as all of the opening edges are positioned within the zone defined above.

In addition, the number of openings 1110, 1112a and 1112b and the optimum size(s) of the opening(s) formed in divider 1000 for a particular application may be determined based on the type of vehicle collision pulse and interior geometry of the vehicle in which the airbag is installed, the desired fill rate of the airbag, the volume ratio, the type of directional valve used, the overall dimensions and curvature of the instrument panel, and other pertinent factors. The size(s) and position(s) of the opening(s) 1110, 1112a and 1112b as described herein facilitate smooth and rapid transfer of inflation gases from the upper chamber to the lower chamber during initial stages of airbag filling. Once equilibrium is substantially reached between the upper and lower chamber pressures, flow from one chamber to the other is reduced. As the occupant begins to load the lower chamber of the cushion, the pressure within the lower chamber increases, causing the operating member of the valve to restrict the backflow of gas from the lower chamber to the upper chamber. This restricted flow now is effectively absorbing energy from the occupant interaction with the bag lower chamber. The flow restriction can also be adjusted or tuned in order to absorb the occupant energy as required for a particular application. Each of the directional valves (not shown) controlling flow from the receiving chamber to the upper and lower chambers can have a single operating member which provides both a desired inflow (to the upper and lower chambers) and a desired backflow (back from the upper and lower chambers) characteristic, or the valve can have one operating member for controlling inflow to the upper (or lower) chamber and another operating member to control outflow from the upper (or lower) chamber. In the later phases of the occupant loading of the cushion, backflow from the lower chamber may go into the receiving chamber and then into the upper chamber, from where it is discharged from the upper chamber into the environment through the main vents (not shown) located in the wall of the upper chamber.

In the case of an Out of Position child in accordance with the FMVSS208 Position-2 testing standard, the initial stages of the cushion deployment development remains the same as described above. However, the gas flow from the receiving chamber into the upper and lower chambers as regulated by the divider valve mechanisms is different when a child interacts with the cushion. In the case of the Out of Position-2 child, the volume of the lower chamber is decreased due to the space occupied by the Out of Position Child. The divider valve mechanisms continue to permit the flow of gases from the receiving chamber into the lower chamber. However, the valve mechanisms also allow the gas to continue to flow into the lower chamber until the cushion's lower chamber and upper chamber internal pressures are in equilibrium, thereby stabilizing the interaction between the cushion and the out of position child. The divider valve mechanisms and cushion main vent designs are structured to facilitate rapid transition of this state of equilibrium into an adaptive state, wherein the cushion changes from a state of gas flow into the lower chamber to a state where the gas flow is increased out of the main vents (located in wall(s) of the upper chamber) into the environment. This increased flow out of the cushion allows for decreased pressure within the upper chamber and then allows for the backflow of gases from the lower chamber back into the receiving chamber and then the upper chamber and out of the main vents into the environment. This adaptability of the valve mechanisms to regulate the flow communication between the two chambers is important for the protection of adult and child occupants.

Referring to FIG. 3A, in the embodiment shown in FIGS. 6 and 7, the divider second portion leading edge is attached to the main panel along a seam 201 positioned so as to reside within a zone Z defined at a lower end Z2 by the hip pivot 202 of a seated Hybrid III 5th female ATD 305, and at an upper end Z1 by the shoulder pivot 206 of a seated Hybrid III 50th ATD 405, inclusive. These boundary positions and other characteristics of all the test ATD's described herein are specified in 49 CFR Part 572, which is incorporated herein by reference in its entirety, and which may be found, for example, at http://www.gpo.gov/fdsys/pkg/CFR-2011-title49-vol7/pdf/CFR-2011-title49-vol7-part572.pdf. In a particular embodiment, the hip pivot 202 of the seated Hybrid III 5th female ATD resides at a vertical distance of 3.30 inches above the portion of the seat in contact with the ATD, and the shoulder pivot 206 of the seated Hybrid III 50th male ATD resides at a distance of 17.5 inches above the portion of the seat in contact with the ATD. Thus, the dimension of the zone Z is 14.2 inches.

While maintaining the positioning of the divider 1000 as described herein, it will be appreciated that as shown in FIG. 8, the effective horizontal length $L_a$ of the inflated airbag proximate to the divider second portion 1000b is less than the effective arcuate length $L_d$ of an arcuate-spanning divider second portion 1000b extending between the occupant contact face 20 and the inflator side 22. It will be appreciated that as used herein, "arcuate length" is meant to convey that at least a portion of the divider second portion length has an arcuate shape. As shown in FIG. 8, a vertical plane P3 tangentially extends through the attachment seam 205 proximate to the instrument panel. Another vertical plane P4 tangentially extends through a frontal portion of the attachment seam 201 on the occupant side 20 of the airbag, wherein P4 is at least substantially parallel to P3. A horizontal axis, L, extends along at least a portion of the divider 1000 to partition the divider second portion 1000b, whereby axis L orthogonally intersects P3 and P4 to define $L_a$ extending between P3 and P4. As also shown, the arcuate length $L_d$ spans between P3 and P4, that is between seams 201 and 205, given that the divider second portion 1000b is of course positioned within the airbag 10. The relationship between these two lengths can be expressed as follows:

$$L_d \geq 1.05 L_a$$

and more preferably, $$L_d \geq 1.10 L_a$$

Stated another way, the length ($L_d$) of the divider second portion 1000b, as it arcuately spans from attachment seams 201 to 205, is at least 5 to 10% greater than the horizontal length $L_a$ of the deployed airbag, as it linearly spans from divider attachment seam 205 proximate the instrument panel to the divider leading edge seam 201 along the occupant side of the airbag. It will be appreciated that a plane P5 may horizontally extend through or near seam 205 and orthogonally intersect P3 and P4. Accordingly, a sub-chamber or region 102a may be defined between the front or occupant-contact side 20 of the airbag and the downturned portion of an arcuately-extending divider 1000, and therefore sub-chamber 102a resides below the plane P5 as the divider 1000 downwardly and arcuately progresses to seam 201.

Stated in yet another way, a passenger-side airbag 1001 for an automotive vehicle contains at least one outer panel 12 forming an airbag 1001, the outer panel 12 having an inner wall 12a and the airbag 1000 also having a linear length $L_a$ extending toward a rear position of the automotive vehicle when the airbag is fully deployed. The airbag 1001 further contains a perforated divider 1000 (containing a first portion 1000a, a second portion 1000b, and openings 1110, 1112a and 1112b and associated flow control valves) sealed and fixed to the inner wall 12a thereby forming an upper chamber 102 and a lower chamber 104 within the airbag 1001, the divider second portion 1000b having an arcuate length extending from the instrument panel toward the rear of the automotive vehicle when the airbag 1001 is fully deployed, wherein the arcuate length is at least 5% greater than the linear length.

It will be appreciated that the additional length of the divider 1000 results in a sub-chamber or sub-region 102a of upper chamber 102. It is believed that the region 102a not only provides sufficient airbag stiffness for adult occupants as shown in ATD testing per FMVSS208 (updated as of Oct. 28, 2013), incorporated herein by reference in its entirety, but that it contributes to an initial upward and then shrouding trajectory of the airbag as it envelopes the head of the out-of-position 2 H-III 3-year old or H-III 6-year old as described herein with minimal force thereupon. Based on head and neck injury data developed from ATD testing pursuant to FMVSS208, it is believed that region 102a and the related divider design features unexpectedly and surprisingly contributes to both the enhanced protection of the adult occupants as well as the enhanced protection for out-of-position youths.

Example 1—Locating the Valve Mechanism(s)

A passenger-side airbag of an occupant protection system is formed by iteratively considering the design variables P14, P15, D11, $L_d$, $L_a$, and Z3 in view of the specific interior of an automotive vehicle associated with the occupant protection system. The following steps are taken:
1. Obtain a vehicle occupant seating drawing defining a centerline of normally-seated H-III adult male 50 percentile (AM50) and H-III adult female 5 percentile (AF05) ATDs.
2. Begin defining the airbag/cushion profile by placing a fully chambered or deployed airbag profile in position for the normally-seated AM50 as shown in the vehicle drawing from step 1.
3. Finalize the airbag/cushion profile by confirming the airbag profile for the forward-seated AF05 to make sure the overlap with regard to the AM50 is acceptable. If desired, minor adjustments may be made with confirmation by testing vis a vis the requirements of FMVSS208. With reference to FIG. 3A, position the center divider 1000 within the zone Z (hip and shoulder region) defined as the thoracic region of the thoracic regions of the AM50 and the AF05 ATDs, thereby defining the protection provided for the adult occupants. Locate the leading edge of the divider second portion 1000b 100a along Z2, that is along the hip areas of the ATDs shown in FIG. 3A 7.
4. Next, locate P15 by using the profile of an H-III 6-year old ATD in out-of-position 2 as per FMVSS208, Section 22. P15 will tangentially intersect the leading edge of the 6-year old ATD head as it rests upon the instrument panel.
5. Next, locate P14 by using the profile of an H-III 3-year old or H-III 6-year old ATD in position 1 as per FMVSS208, Section 22. P14 will intersect the centerline of the shoulder bolt 701 (see FIG. 7F), and extend substantially parallel to P15.
6. Next, with regard to P15 and P14, and the "filled-cushion" or deployed profile of the airbag, Z3 is established between the two planes P14 and P15 along the divider 1000.
7. Locate one or more openings 1110, 1112a and 1112b and associated valves within Z3 as defined by P15 and P14, preferably along the center of divider 1000, as defined in FIG. 8 as axis L for example.
8. Adjustments may be made to the location of openings 1110, 1112a and 1112b and associated valves by varying the longitudinal and/or lateral positioning of the openings 1110, 1112a and 1112b and associated valves within Z3 and about the axis L (of FIG. 8) based on desired deployment trajectory and OOP performance.
9. Hole size adjustment may be iteratively calculated based on occupant protection requirements as determined from the crash pulse, degree of pitch, and other movements of the vehicle, these variables as understood by those of ordinary skill in the art.

An airbag and an occupant protection system for an automotive vehicle containing the airbag, wherein the airbag is made in accordance with the method given above, are also contemplated in accordance with the present invention. The passenger side airbag for each unique vehicle may therefore be designed by iteratively reconciling the requirements of FMVSS208 with the present airbag design for each vehicle.

In particular embodiments, the opening 1112a may be spaced apart from side panel 14 a different distance than opening 1112b is spaced apart from side panel 116.

In particular embodiments, the opening 1112a may be spaced apart from front impact side 20 a different distance than opening 1112b is spaced apart from the front impact side.

In the embodiment shown, openings 1112a and 1112b are the same size, to provide substantially gas flowrates along both side panels 14 and 16 into lower chamber 104. In other embodiments, the sizes of openings 1112a and 1112b may be different, to preferentially fill one side of the lower chamber more rapidly than the other side, depending on the requirements of a particular application.

In the embodiment shown in FIGS. 6 and 7, the openings 1110, 1112*a* and 1112*b* are sized and/or positioned so as to create a "throttling" effect on gases tending to flow out of lower chamber 104 through receiving chamber 101 and into upper chamber 102, responsive to a pressure surge in the lower chamber resulting from the impact of a vehicle passenger on the lower portion of the airbag. The combined sizes of the openings 1112*a* and 1112*b* and the size of opening 1110 may be specified in relation to each other such that the combined flow rate of gases through the openings 1112*a* and 1112*b* and into chamber 101 exceeds the rate at which gases under the same pressure can flow through opening 110. This disparity in the sizes of the openings produces a back pressure during airbag inflation, which slows or delays the flow of gases from the lower chamber to the upper chamber responsive to passenger impact on the lower portion of the airbag, thereby maintaining the gases and elevated pressure within the lower chamber for a longer period.

In addition, as seen in FIG. 6, because opening 1110 is not aligned with either of openings 1112*a* and 1112*b* along a flow path of gases out of the openings 1112*a* and 1112*b*, the flow path length L2 of gases from openings 112*a* and 112*b* to opening 110 (similar to the embodiment shown in FIG. 2) is relatively longer than the path would be if the openings were closer together or more closely aligned (for example, along plane L). This causes an additional delay in the flow of gases between the lower chamber and the upper chamber.

Referring now to FIG. 9, an embodiment 10 of the airbag described herein may be incorporated into an airbag system 900. Airbag system 900 includes at least one gas source 915 (for example, a known inflator or gas generating system) and airbag 10 in accordance with an embodiment described herein. The airbag is operatively coupled to the gas source so as to enable fluid communication therewith upon activation of the gas generating system. Airbag system 900 may also include (or be in communication with) a collision event sensor 910. Collision event sensor 910 includes a known collision sensor algorithm that prompts actuation of airbag system 900 via, for example, activation of gas source 915 in the event of a collision.

Referring again to FIG. 9, airbag system 900 may also be incorporated into a broader, more comprehensive vehicle occupant protection system 800 including additional elements such as a safety belt assembly 850. FIG. 9 shows a schematic diagram of one exemplary embodiment of such a protection system. Safety belt assembly 850 includes a safety belt housing 852 and a safety belt 860 extending from housing 852. A safety belt retractor mechanism 854 (for example, a spring-loaded mechanism) may be coupled to an end portion of the belt. In addition, a known safety belt pretensioner 856 may be coupled to belt retractor mechanism 854 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 850 may also include (or be in communication with) a collision event sensor 858 (for example, an inertia sensor or an accelerometer) including a known collision sensor algorithm that prompts actuation of belt pretensioner 856 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

References herein to the positions or orientations of elements, for example "upper", "lower", "above", "below", etc., refer to characteristics of an inflated airbag when mounted in a vehicle and are viewed from the perspective of an occupant of the vehicle when the airbag is inflated. It should be noted that the orientation of various elements may differ according to other exemplary embodiments, and that such variations are intended to be encompassed by the present disclosure.

It will be understood that the foregoing descriptions of the various embodiments are for illustrative purposes only. As such, the various structural and operational features herein disclosed are susceptible to a number of modifications, none of which departs from the scope of the appended claims.

What is claimed is:

1. An airbag comprising:
   an outer shell defining an interior of the airbag;
   a divider attached to the outer shell so as to define an upper chamber, a lower chamber, and a gas-receiving chamber positioned between the upper and lower chambers;
   an inflation side and a vehicle occupant contact side opposite the inflation side; and
   a first portion of the divider attached to the inflation side and to the vehicle occupant contact side and a second portion of the divider attached to the inflation side and to the vehicle occupant contact side, such that the first and second portions tend to converge from the inflation side toward the occupant contact side,
   wherein the divider is structured to enable independent and simultaneous control of the inflation of said upper and lower chambers, and, the entire receiving chamber resides below the upper chamber and above the lower chamber.

2. The airbag of claim 1 wherein the first portion is attached to the inflation side only above a mouth of the airbag through which gas is injected into the airbag, and wherein the second portion is attached to the inflation side only below the mouth of the airbag.

3. The airbag of claim 1 wherein the airbag further comprises a first side panel and a second side panel opposite the first side panel, and wherein the first portion and the second portion are attached to the occupant contact side along a seam having a first end at the first side panel and a second end at the second side panel.

4. The airbag of claim 1 wherein the upper chamber is bounded by a vehicle occupant contact side, and the lower chamber is bounded by the vehicle occupant contact side and separated from the upper chamber by the divider.

5. The airbag of claim 1 wherein the first portion has at least one opening enabling fluid communication between the receiving chamber and the first chamber, and wherein the second portion has at least one opening enabling fluid communication between the receiving chamber and the second chamber.

6. The airbag of claim 5 wherein the second portion has a first opening positioned between a central longitudinal plane L of the airbag and a first side panel of the airbag, and a second opening positioned between the central longitudinal plane L and a second side panel of the airbag opposite the first side panel.

7. The airbag of claim 6 wherein the second portion first and second openings are structured such that a flow rate of gas from the receiving chamber into the lower chamber is greater than a flowrate of gas from the receiving chamber into the upper chamber, during inflation of the airbag.

8. An airbag system including an airbag in accordance with claim 1.

9. A vehicle occupant protection system including an airbag in accordance with claim 1.

10. An airbag comprising:
 an inflation side and a vehicle occupant contact side opposite the inflation side; and
 a divider having a first portion attached to the inflation side and to the vehicle occupant contact side and a second portion attached to the inflation side and to the vehicle occupant contact side, said first portion converging from the inflation side toward the occupant contact side to thereby contact the second portion, wherein fluid flows through said first portion and through said second portion.

11. An airbag system including an airbag in accordance with claim 10.

12. A vehicle occupant protection system including an airbag in accordance with claim 10.

13. An airbag comprising:
 an inflation side and a vehicle occupant contact side opposite the inflation side;
 a divider having a first portion attached to the inflation side and to the vehicle occupant contact side and a second portion attached to the inflation side and to the vehicle occupant contact side, said first portion converging from the inflation side toward the vehicle occupant contact side to thereby contact the second portion;
 at least one first gas orifice in said first portion and at least one second gas orifice in said second portion, said first and second gas orifices in a non-aligned relationship upon actuation of said airbag.

14. The airbag of claim 13 further comprising:
 a gas receiving chamber;
 a first chamber fluidly communicating with said gas receiving chamber via said at least one first gas orifice; and
 a second chamber fluidly communicating with said gas receiving chamber via said at least one second gas orifice.

15. The airbag of claim 14 wherein said gas receiving chamber is completely between said first and second chambers.

16. The airbag of claim 14 wherein upon actuation of said airbag, said first chamber is an upper chamber generally juxtaposed to an upper part of an occupant, and, said second chamber is a lower chamber generally juxtapoxed to a lower part of an occupant.

* * * * *